(12) United States Patent
Kelly et al.

(10) Patent No.: US 12,662,279 B2
(45) Date of Patent: Jun. 23, 2026

(54) CONTAINER WITH MARK OR MARKINGS FOR TRACKING AND TRACING

(71) Applicant: Ball Corporation, Westminster, CO (US)

(72) Inventors: Jason M. Kelly, Arvada, CO (US); Sarah I. Merrill, Denver, CO (US); Adam P. Stowitts, Arvada, CO (US)

(73) Assignee: BALL CORPORATION, Westminster, CO (US)

( * ) Notice: Subject to any disclaimer, the term of this patent is extended or adjusted under 35 U.S.C. 154(b) by 485 days.

(21) Appl. No.: 17/681,549

(22) Filed: Feb. 25, 2022

(65) Prior Publication Data

US 2022/0274729 A1 Sep. 1, 2022

Related U.S. Application Data

(60) Provisional application No. 63/154,124, filed on Feb. 26, 2021.

(51) Int. Cl.
B65B 61/26 (2006.01)
B65B 61/02 (2006.01)
(Continued)

(52) U.S. Cl.
CPC ............ B65B 61/26 (2013.01); B65B 61/025 (2013.01); B65D 17/4012 (2018.01); G06K 1/121 (2013.01); G06Q 10/087 (2013.01)

(58) Field of Classification Search
CPC .......... G05B 19/41865; G05B 19/4183; G05B 19/4184; G05B 19/41875; G06Q 10/087; G06Q 10/06; G06Q 50/04; G06Q 10/08;

G06Q 10/00; G06Q 10/0833; B41M 5/24; B41M 5/26; B41M 1/28; B41M 1/40; B41M 5/0047; B41M 5/0058;
(Continued)

(56) References Cited

U.S. PATENT DOCUMENTS 3,086,889 A 4/1963 Strong
3,230,925 A 1/1966 Blanz
(Continued)

FOREIGN PATENT DOCUMENTS

CA 2307074 9/2001
CA 2301655 4/2009
(Continued)

OTHER PUBLICATIONS

"Beverage Can Line," Stolle Machinery Company, LLC, 2020, 8 pages.
(Continued)

*Primary Examiner* — Darrin D Dunn
(74) *Attorney, Agent, or Firm* — Sheridan Ross P.C.

(57) ABSTRACT

Systems, methods, and apparatuses for marking a container for tracking and tracing the container throughout the lifecycle of the container. The mark can be applied, for example, on the closed end, bottom dome, or an end closure of the container. Tracking and tracing a container at various points during its lifecycle such as point of sale, where the container is recycled or destroyed, etc. provides valuable information that can be used to improve and incentivize recycling and deposit return public policies and environmental programs.

20 Claims, 14 Drawing Sheets

(51) Int. Cl.

| | |
|---|---|
| *B65D 17/28* | (2006.01) |
| *G06K 1/12* | (2006.01) |
| *G06Q 10/087* | (2023.01) |

(58) Field of Classification Search
    CPC .......... B23K 26/0846; B23K 2101/007; B23K
                2101/16; B65D 2203/06; B65D 1/165
    See application file for complete search history.

(56) References Cited

U.S. PATENT DOCUMENTS

| | | | |
|---|---|---|---|
| 3,286,302 | A | 11/1966 | Doering |
| 3,818,335 | A | 6/1974 | Stungis et al. |
| 3,898,417 | A | 8/1975 | Atkinson |
| 4,024,545 | A | 5/1977 | Dowling et al. |
| 4,165,399 | A | 8/1979 | Germonprez |
| 4,203,240 | A | 5/1980 | Goodwin |
| 4,280,427 | A * | 7/1981 | Potts ................. B65D 17/4012 |
| | | | 413/15 |
| 4,304,981 | A | 12/1981 | Gappa |
| 4,393,411 | A | 7/1983 | Amtower |
| 4,449,042 | A | 5/1984 | Hampson et al. |
| 4,467,207 | A | 8/1984 | Lerner et al. |
| 4,485,935 | A | 12/1984 | Stoffel |
| 4,559,729 | A | 12/1985 | White |
| 4,568,230 | A | 2/1986 | Brown |
| 4,635,545 | A | 1/1987 | Kubacki et al. |
| 4,879,457 | A | 11/1989 | Ludden |
| 4,922,077 | A | 5/1990 | Gordon |
| 4,965,829 | A | 10/1990 | Lemelson |
| 5,125,780 | A | 6/1992 | Budenbender |
| 5,170,279 | A | 12/1992 | Schwartz et al. |
| 5,177,368 | A | 1/1993 | Kay |
| 5,202,199 | A | 4/1993 | Mitzutani et al. |
| 5,215,864 | A | 6/1993 | Laakmann |
| 5,235,454 | A | 8/1993 | Iwasaki |
| 5,247,154 | A | 9/1993 | Ahmed |
| 5,315,108 | A | 5/1994 | Gross |
| 5,331,443 | A | 7/1994 | Stanisci |
| 5,353,356 | A | 10/1994 | Waugh |
| RE34,837 | E | 1/1995 | Iwanami et al. |
| 5,401,979 | A | 3/1995 | Kooijman et al. |
| 5,555,992 | A | 9/1996 | Sedgeley |
| 5,632,916 | A | 5/1997 | Lappalainen et al. |
| 5,653,900 | A | 8/1997 | Clement et al. |
| 5,719,372 | A | 2/1998 | Togari et al. |
| 5,742,037 | A | 4/1998 | Scola et al. |
| 5,751,436 | A | 5/1998 | Kwon et al. |
| 5,777,876 | A * | 7/1998 | Beauchesne ..... G05B 19/41865 |
| | | | 700/95 |
| 5,788,076 | A | 8/1998 | Simmons |
| 5,837,962 | A | 11/1998 | Overbeck |
| 5,855,969 | A | 1/1999 | Robertson |
| 5,864,788 | A | 1/1999 | Kutsumi |
| 5,992,892 | A | 11/1999 | Schaefer et al. |
| 6,021,266 | A | 2/2000 | Kay |
| 6,053,349 | A | 4/2000 | Griggs, Jr. et al. |
| 6,062,556 | A | 5/2000 | McCay |
| 6,080,958 | A * | 6/2000 | Miller .................... B23K 26/08 |
| | | | 219/121.68 |
| 6,105,806 | A | 8/2000 | Stasiuk |
| 6,202,880 | B1 | 3/2001 | Strube et al. |
| 6,314,562 | B1 | 11/2001 | Biggerstaff |
| 6,390,368 | B1 | 5/2002 | Edwards |
| 6,433,302 | B1 | 8/2002 | Miller et al. |
| 6,460,723 | B2 | 10/2002 | Nguyen et al. |
| 6,478,861 | B1 | 11/2002 | Kwan et al. |
| 6,479,787 | B1 * | 11/2002 | Jendick .............. B23K 26/0846 |
| | | | 219/121.75 |
| 6,498,318 | B1 | 12/2002 | Miller et al. |
| 6,533,518 | B1 | 3/2003 | Turner et al. |
| 6,685,094 | B2 | 2/2004 | Cameron |
| 6,706,995 | B2 | 3/2004 | Miller et al. |
| 6,745,384 | B1 | 6/2004 | Biggerstaff |
| 6,808,351 | B1 | 10/2004 | Brown et al. |

| | | | |
|---|---|---|---|
| 6,872,913 | B1 | 3/2005 | Jendick |
| 6,877,607 | B2 | 4/2005 | Jenkins |
| 6,926,487 | B1 | 8/2005 | Jendick |
| 7,108,469 | B2 | 9/2006 | Jenkins |
| 7,227,166 | B2 | 6/2007 | Cochran et al. |
| 7,638,252 | B2 | 12/2009 | Stasiak et al. |
| 7,972,426 | B2 | 7/2011 | Hinch et al. |
| 8,146,768 | B2 | 4/2012 | Forrest et al. |
| 8,608,007 | B2 | 12/2013 | Seo |
| 8,708,188 | B2 | 4/2014 | Chapin |
| 8,720,077 | B1 | 5/2014 | Fallisgaard |
| 8,844,747 | B2 | 9/2014 | Petti |
| 9,007,413 | B2 | 4/2015 | Boisvert et al. |
| 9,186,924 | B2 | 11/2015 | Lewis |
| 9,278,776 | B2 | 3/2016 | Ramsey et al. |
| 9,340,368 | B2 | 5/2016 | Ellefson et al. |
| 9,495,572 | B2 | 11/2016 | Sempere et al. |
| 9,517,498 | B2 | 12/2016 | Siles et al. |
| 9,592,569 | B2 | 3/2017 | Reed et al. |
| 9,652,652 | B2 | 5/2017 | Aspert et al. |
| 9,663,846 | B2 | 5/2017 | Siles et al. |
| 10,073,443 | B2 | 9/2018 | Gorsuch et al. |
| 10,118,729 | B2 | 11/2018 | Lewis |
| 10,227,158 | B2 | 3/2019 | Miller, Jr. |
| 10,421,111 | B2 | 9/2019 | Gorsuch et al. |
| 10,442,564 | B2 | 10/2019 | Ojima et al. |
| 10,549,921 | B2 | 2/2020 | Leitzen et al. |
| 10,583,668 | B2 | 3/2020 | Yohn |
| 10,726,288 | B2 | 7/2020 | Hirt et al. |
| 10,810,394 | B2 | 10/2020 | Smith et al. |
| 10,889,104 | B2 | 1/2021 | Noll et al. |
| 11,192,390 | B2 | 12/2021 | Noll et al. |
| 11,326,066 | B2 | 5/2022 | Amako et al. |
| 11,534,817 | B2 | 12/2022 | Mercer et al. |
| 11,739,024 | B2 | 8/2023 | Vandecruys et al. |
| 11,884,056 | B2 | 1/2024 | Hughes et al. |
| 2002/0075504 | A1 | 6/2002 | Fernandez et al. |
| 2003/0015507 | A1 | 1/2003 | Miller et al. |
| 2003/0044582 | A1 | 3/2003 | Sakoske |
| 2003/0158795 | A1* | 8/2003 | Markham .............. G06Q 10/10 |
| | | | 705/28 |
| 2004/0108237 | A1 | 6/2004 | McClintock |
| 2005/0045637 | A1 | 3/2005 | Rohr et al. |
| 2005/0075900 | A1 | 4/2005 | Arguimbau, III |
| 2005/0190367 | A1 | 9/2005 | Colvill et al. |
| 2005/0256788 | A1 | 11/2005 | Mukai et al. |
| 2006/0004475 | A1 | 1/2006 | Brackett et al. |
| 2006/0047454 | A1* | 3/2006 | Tamaki .................. G06Q 10/06 |
| | | | 702/84 |
| 2006/0117980 | A1 | 6/2006 | Cesak et al. |
| 2006/0140746 | A1 | 6/2006 | Koon |
| 2006/0151501 | A1 | 7/2006 | Chang et al. |
| 2008/0011772 | A1 | 1/2008 | Morris et al. |
| 2008/0302153 | A1 | 12/2008 | Kondo et al. |
| 2009/0008859 | A1 | 1/2009 | Fairweather et al. |
| 2009/0179375 | A1 | 7/2009 | Tamura et al. |
| 2009/0204415 | A1* | 8/2009 | Baiera .................. G06Q 10/087 |
| | | | 705/303 |
| 2010/0024364 | A1 | 2/2010 | Schagidow et al. |
| 2010/0088665 | A1 | 4/2010 | Langworthy et al. |
| 2010/0131936 | A1 | 5/2010 | Cheriton |
| 2010/0276466 | A1 | 11/2010 | Kameda |
| 2011/0084051 | A1 | 4/2011 | Reed et al. |
| 2011/0115815 | A1 | 5/2011 | Xu et al. |
| 2012/0209783 | A1 | 8/2012 | Smith |
| 2012/0241043 | A1 | 9/2012 | Perazzo et al. |
| 2013/0075401 | A1 | 3/2013 | Forrest |
| 2013/0098928 | A1 | 4/2013 | Selepack et al. |
| 2013/0224379 | A1 | 8/2013 | Kitamura et al. |
| 2014/0084003 | A1* | 3/2014 | Ramsey .................. B65D 51/00 |
| | | | 413/18 |
| 2014/0271043 | A1 | 9/2014 | Butcher et al. |
| 2014/0271044 | A1 | 9/2014 | Butcher et al. |
| 2014/0291322 | A1 | 10/2014 | Ramsey et al. |
| 2015/0014984 | A1 | 1/2015 | Decoux et al. |
| 2015/0020205 | A1 | 1/2015 | Wang et al. |
| 2015/0020364 | A1 | 1/2015 | Bonfoey |
| 2015/0027327 | A1 | 1/2015 | Ellefson |
| 2015/0076218 | A1 | 3/2015 | Wood et al. |

(56)　　　　　References Cited

U.S. PATENT DOCUMENTS

| | | |
|---|---|---|
| 2015/0158627 A1 | 6/2015 | Ramsey et al. |
| 2015/0174638 A1 | 6/2015 | Anguera et al. |
| 2015/0174917 A1 | 6/2015 | Noll et al. |
| 2015/0209854 A1 | 7/2015 | Selepack |
| 2015/0243108 A1 | 8/2015 | Nakayama |
| 2015/0353236 A1 | 12/2015 | Gentile et al. |
| 2015/0375943 A1 | 12/2015 | Ellefson et al. |
| 2016/0016687 A1 | 1/2016 | Ramsey et al. |
| 2016/0034805 A1 | 2/2016 | Ramsey |
| 2016/0046033 A1 | 2/2016 | Zuech et al. |
| 2016/0114501 A1 | 4/2016 | Carson et al. |
| 2016/0179909 A1 | 6/2016 | Wells |
| 2016/0221065 A1 | 8/2016 | Butcher et al. |
| 2016/0332772 A1* | 11/2016 | Ramsey .................. B41M 5/28 |
| 2016/0350090 A1 | 12/2016 | Kawaguchi |
| 2017/0061350 A1 | 3/2017 | Smith et al. |
| 2017/0132724 A1 | 5/2017 | Aqlan |
| 2017/0197241 A1 | 7/2017 | Ellefson |
| 2017/0349343 A1 | 12/2017 | Wu et al. |
| 2018/0015498 A1 | 1/2018 | Nicol et al. |
| 2018/0032951 A1 | 2/2018 | Chanez |
| 2018/0046114 A1 | 2/2018 | Stowitts |
| 2018/0164719 A1 | 6/2018 | Stowitts |
| 2018/0197053 A1 | 7/2018 | Picard |
| 2018/0273233 A1 | 9/2018 | Giampietro |
| 2018/0345709 A1 | 12/2018 | Loccufier et al. |
| 2019/0018396 A1* | 1/2019 | Gorsuch ........... B23K 26/0846 |
| 2019/0084029 A1* | 3/2019 | Jentzsch ................ B21D 22/28 |
| 2019/0095928 A1 | 3/2019 | Lane |
| 2019/0234974 A1 | 8/2019 | Wiederin et al. |
| 2019/0240703 A1 | 8/2019 | Kiefer |
| 2019/0329955 A1 | 10/2019 | Thompson |
| 2019/0354094 A1 | 11/2019 | Lin |
| 2020/0016918 A1 | 1/2020 | Weiss et al. |
| 2020/0047480 A1 | 2/2020 | Gamito et al. |
| 2020/0070494 A1 | 3/2020 | Lefevre et al. |
| 2020/0174462 A1 | 6/2020 | Sirohi |
| 2020/0175239 A1 | 6/2020 | Herrera et al. |
| 2020/0210664 A1 | 7/2020 | Taylor |
| 2020/0219112 A1* | 7/2020 | Nakayama ............. B65G 61/00 |
| 2020/0342463 A1 | 10/2020 | Whittington et al. |
| 2020/0356798 A1* | 11/2020 | Kotula .................. G06T 7/0002 |
| 2021/0089727 A1* | 3/2021 | Moran ............... G06K 7/10099 |
| 2021/0132597 A1 | 5/2021 | Saunders, Jr. et al. |
| 2021/0162733 A1 | 6/2021 | Ojima et al. |
| 2021/0206186 A1 | 7/2021 | Ramsey |
| 2021/0214152 A1 | 7/2021 | Thompson et al. |
| 2021/0232128 A1* | 7/2021 | Kiefer ............. G05B 19/41875 |
| 2021/0261290 A1 | 8/2021 | Chiji et al. |
| 2021/0276069 A1 | 9/2021 | Johnson et al. |
| 2021/0309004 A1 | 10/2021 | Atramiz et al. |
| 2021/0362537 A1 | 11/2021 | Ramsey |
| 2021/0379131 A1 | 12/2021 | Alsayar et al. |
| 2022/0032670 A1 | 2/2022 | Yamada et al. |
| 2022/0097436 A1 | 3/2022 | Schutte et al. |
| 2022/0108142 A1 | 4/2022 | Bathelet |
| 2022/0126599 A1 | 4/2022 | Miller et al. |
| 2022/0134789 A1 | 5/2022 | Goldstein |
| 2022/0143754 A1 | 5/2022 | Hori et al. |
| 2022/0148457 A1 | 5/2022 | Takaoka |
| 2022/0164936 A1* | 5/2022 | Shibata ................... G06T 7/001 |
| 2022/0363438 A1 | 11/2022 | Vandecruys et al. |
| 2022/0404818 A1 | 12/2022 | Stock et al. |
| 2023/0049800 A1 | 2/2023 | Eve et al. |
| 2023/0081638 A1 | 3/2023 | Tochigi et al. |
| 2023/0186252 A1 | 6/2023 | Burke |

FOREIGN PATENT DOCUMENTS

| | | |
|---|---|---|
| CA | 2867218 | 9/2013 |
| CA | 2778711 | 9/2015 |
| CA | 2769856 | 4/2017 |
| CN | 1313801 | 9/2001 |
| CN | 102009222 | 4/2011 |
| CN | 102409364 | 4/2012 |
| CN | 103715390 | 4/2014 |
| CN | 103786057 | 5/2014 |
| CN | 203845533 | 9/2014 |
| CN | 113329887 | 8/2021 |
| CN | 118348932 | 7/2024 |
| EP | 0993964 | 4/2000 |
| EP | 1467306 | 10/2004 |
| EP | 1123772 | 12/2006 |
| EP | 1123815 | 3/2011 |
| EP | 1590108 | 6/2011 |
| EP | 3556675 | 10/2019 |
| EP | 3660654 | 6/2020 |
| EP | 3751529 | 12/2020 |
| EP | 3858616 | 8/2021 |
| EP | 4129492 | 2/2023 |
| FR | 3063367 | 8/2018 |
| GB | 2154775 | 9/1985 |
| GB | 2320008 | 6/1998 |
| GB | 2428659 | 11/2007 |
| GB | 2428668 | 7/2008 |
| GB | 2576679 | 2/2020 |
| JP | S63-252746 | 10/1988 |
| JP | H08-175006 | 7/1996 |
| JP | H09-226776 | 9/1997 |
| JP | 3971064 | 9/2007 |
| JP | 4532259 | 8/2010 |
| JP | 2011-006093 | 1/2011 |
| JP | 2011-011760 | 1/2011 |
| JP | 2011-016545 | 1/2011 |
| JP | 2011-016546 | 1/2011 |
| JP | 2011-20701 | 2/2011 |
| SU | 791207 | 12/1980 |
| WO | WO 2005/104005 | 11/2005 |
| WO | WO 2007/007102 | 1/2007 |
| WO | WO 2009/069517 | 6/2009 |
| WO | WO 2011/053776 | 5/2011 |
| WO | WO 2013/049313 | 4/2013 |
| WO | WO 2013/135899 | 9/2013 |
| WO | WO 2013/138595 | 9/2013 |
| WO | WO 2013/155423 | 10/2013 |
| WO | WO 2014/028360 | 2/2014 |
| WO | WO 2014/063837 | 5/2014 |
| WO | WO 2014/072455 | 5/2014 |
| WO | WO 2014/150647 | 9/2014 |
| WO | WO 2014/152858 | 9/2014 |
| WO | WO 2014/187474 | 11/2014 |
| WO | WO 2016/168636 | 10/2016 |
| WO | WO 2016/183452 | 11/2016 |
| WO | WO 2017/027727 | 2/2017 |
| WO | WO 2018/033627 | 2/2018 |
| WO | WO 2018/109110 | 6/2018 |
| WO | WO 2018/206543 | 11/2018 |
| WO | WO 2019/049454 | 3/2019 |
| WO | WO 2019/238791 | 12/2019 |
| WO | WO 2020/035835 | 2/2020 |
| WO | WO 2020/067099 | 4/2020 |
| WO | WO 2021/220900 | 11/2021 |
| WO | WO 2022/183054 | 9/2022 |
| WO | WO 2022/271692 | 12/2022 |
| WO | WO 2023/017303 | 2/2023 |
| WO | WO 2023/017304 | 2/2023 |
| WO | WO 2023/017305 | 2/2023 |

OTHER PUBLICATIONS

"Beverage Cans and Ends," ArdaghGroup, 2016, 13 pages.
"Bringing Augmented Reality to Cans," Crown, 2021, 2 pages.
"Charisma of laser marking on the pop can," hglaser.com, May 20, 2018, 4 pages [retrieved online Jul. 30, 2020 from: en.hglaser.com/news/16765_for_CompanyNews_text.htm].
"F-Series for Beverage Premium Fibre Laser," Domino, 2021, 5 pages.
"Inside a Ball Beverage Can Plant," Ball, Sep. 2002, 1 page [retrieved online from: www.ball.com/Ball/media/Ball/Global/Downloads/How_a_Ball_Metal_Beverage_Can_Is_Made.pdf?ext=.pdf].
"High-Speed Marking on Beverage Cans," BNP Media, Dec. 3, 2021, 3 pages.

(56)         References Cited

OTHER PUBLICATIONS

"How Ball Makes Beverage Ends," Ball, last modified Dec. 5, 2013, 1 page [retrieved from: http://www.ball.com/images/ball_com/product_options_files/How_Ball_Makes_Beverage_Ends.pdf].

"How Ball Makes Three-Piece Welded Cans," Ball, Feb. 2017, 1 page [retrieved online from: www.ball.com/Ball/media/Ball/Global/Downloads/How_Ball_Makes_Three-Piece_Weldedl_Food_Cans.pdf?ext=.pdf].

"How Ball Builds Better Cans," Ball, Feb. 2017, 2 pages [retrieved online from: www.ball.com/Ball/media/Ball/Global/Downloads/How-Ball-Builds-Better-Cans_2.pdf?ext=.pdf].

"Lasered Tabs," Ball Corporation, 2016, 2 pages [retrieved online Jul. 30, 2020 from: www.ball.com/na/solutions/markets-capabilities/capabilities/beverage-ends/lasered-tabs].

"Videojet® Allprint LN100A ND: Yag Laser Marking System," Videojet Technologies Inc., © 2010, 2 pages.

Arthur "CrownSmart uses scannable codes under can tabs to give insight into consumer behaviour," Container and Packaging, William Reed Business Media Ltd, Nov. 19, 2015, 2 pages [retrieved online Jul. 30, 2020 from: www.beveragedaily.com/Article/2015/11/19/CrownSmart-uses-scannable-codes-under-can-tabs-to-give-insight-into-consumer-behaviour#].

Glinz "QR-Code Marking on Beverage Can Lids," FOBA Blog, Apr. 13, 2018, 2 pages [retrieved online Jul. 30, 2020 from: www.fobalaser.com/blog/qr-code-markierung-auf-getraenkedosen].

Mccauley "How to silk print barcodes and make them scannable," Container and Packaging Supply, Inc., Sep. 8, 2020, 11 pages [retrieved online Jul. 30, 2020 from: www.containerandpackaging.com/resources/how-to-silk-print-barcodes-and-make-them-scannable-2/].

Nachtrieb "Printing Barcodes on Metal," barcode-test.com, Jun. 24, 2013, 2 pages [retrieved online Jul. 30, 2020 from: barcode-test.com/301/printing-barcodes-on-metal].

International Search Report and Written Opinion for International (PCT) Patent Application No. PCT/US22/18002, dated May 23, 2022 11 pages.

Extended Search Report for European Patent Application No. 22760528.4, dated Jul. 3, 2024 16 pages.

Official Action with English Summary for Mexico Patent Application No. MX/a/2023/010012, dated Mar. 18, 2026 5 pages.

* cited by examiner

112

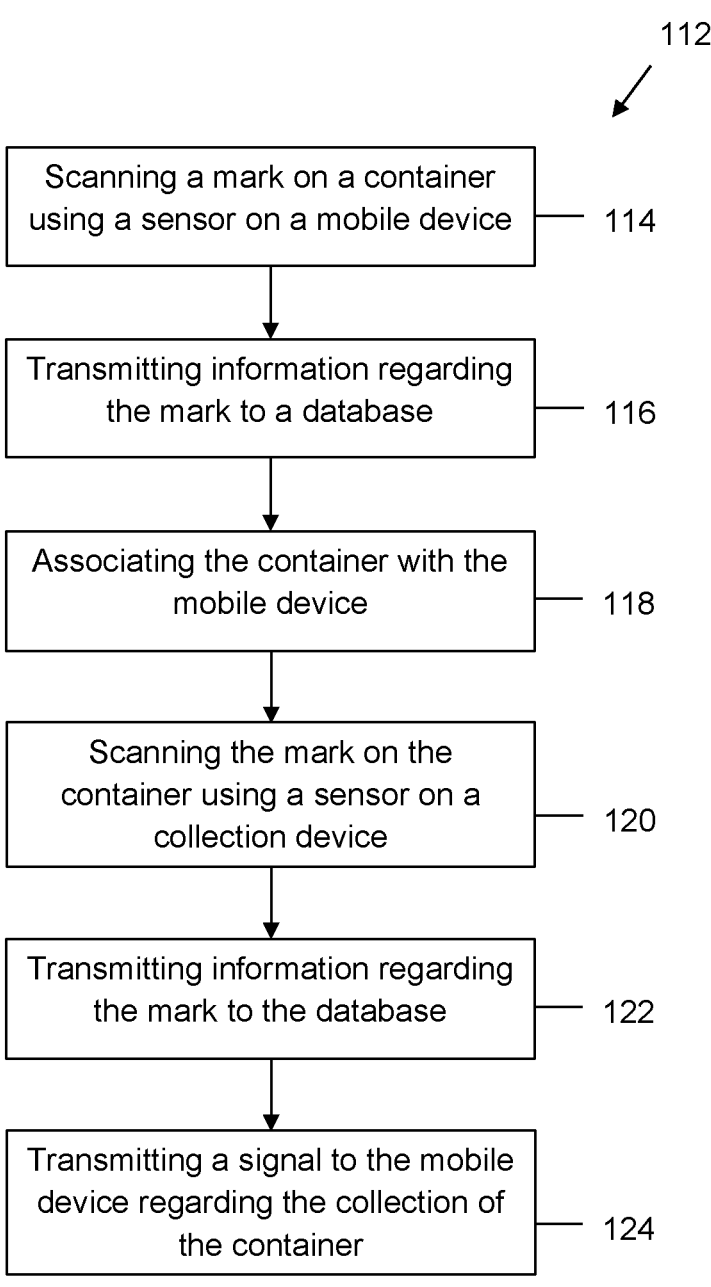

Scanning a mark on a container using a sensor on a mobile device — 114

Transmitting information regarding the mark to a database — 116

Associating the container with the mobile device — 118

Scanning the mark on the container using a sensor on a collection device — 120

Transmitting information regarding the mark to the database — 122

Transmitting a signal to the mobile device regarding the collection of the container — 124

Fig. 8

CONTAINER WITH MARK OR MARKINGS FOR TRACKING AND TRACING

CROSS-REFERENCE TO RELATED APPLICATION

This application claims priority and benefits under 35 U.S.C. § 119(e) to U.S. Provisional Patent Application Ser. No. 63/154,124 filed on Feb. 26, 2021, which is incorporated herein in its entirety by reference.

FIELD

The present disclosure relates generally to systems, methods, and apparatus for marking containers for tracking and tracing throughout their lifecycles.

BACKGROUND

Recycling has been, and continues to be, one of the primary ways to reduce pollution, contaminants, and related negative environmental effects. Pollution is a particularly acute issue for food and beverage packaging since consumers buy and consume food and beverages stored in disposable packaging on a frequent and periodic basis. Recycling diverts packaging for food and beverages as well as other consumer products away from landfills and oceans to manufacturing plants where the packaging is reused to create additional packaging or to make completely unrelated products. As a result, pollution and contaminants in landfills and oceans are reduced. In addition, less raw material is extracted from the earth to produce the additional packaging or unrelated products, which further reduces negative effects on the environment.

Recycling is incentivized in a number of ways. For instance, a commercial advertisement campaign can be used to provide information to consumers and to persuade consumers to recycle. The advertisements can show the negative effects of pollution and inform consumers which materials are recyclable, where to recycle, how to recycle, etc. Some U.S. states and foreign countries have public policies and environmental programs where a container or other product can be returned for money. For example, California has a recycling program where many containers and bottles can be returned to one of 2,000 recycling centers for 5¢ per container or bottle.

There are several issues with existing recycling programs, information, and incentives. Advertisement campaigns are expensive, and thus, are not persistent in the minds of consumers. Moreover, with so many different means and platforms for receiving advertisements, a given consumer who does not monitor all means and platforms may simply miss the advertisement. Recycling programs in the U.S. are run by states, and thus, a given consumer may not appreciate the specific recycling program when traveling or moving between states. In addition, monetary incentives such as 5¢ per container may not sufficiently incentivize a consumer to travel to a recycling center to return a container. Thus, there is a need to provide incentives to consumers to encourage recycling and to enable manufacturers and retailers to track the lifecycle of recyclable products.

SUMMARY

The present disclosure provides systems, methods, and apparatuses for marking a container for tracking and tracing the container throughout the lifecycle of the container. A particular mark with information about the container can be applied to the container. Devices with sensors can read this mark, and therefore, track and trace the container at various locations and by manufacturers, fillers, retailers, consumers, recyclers, etc. This information can then be used to incentivize consumers to recycle and to target advertising campaigns, and to provide valuable information in the supply chain to assure increased recycling. Moreover, this information can be used to combat counterfeit containers and products as well as comply with any legal regulations.

It is one aspect of embodiments of the present disclosure to provide a mark on a container that comprises information about the container. Alternatively or in addition, the mark can be applied to many different areas of the container including the sidewall of the container. In some embodiments, the mark is applied to a portion of a closed end such as a dome or to a portion of an end closure, such as a tab, since the dome and the end closure generally remain intact, even after the container is crushed. The mark can be a variety of different kinds of marks as discussed herein. This information stored or encoded in the mark can include a unique identifier for the particular container on which the mark is affixed. Alternatively or in addition, the information can include the production date and location, container size, container contents, production batch, production shift, material specifications, etc. Further, the production information can include a build of material capture, which can include information about the metal or substrate, the coatings used during manufacturing, the inks used during manufacturing, the lubricants used during manufacturing, the equipment used during manufacturing, etc.

Moreover, the mark itself can serve as a store of information. For example, during the manufacture of the container or a part of the container, the mark applied can include, for example, production information. Therefore, there is less data to store on the overall system or a database. Further, a mistake in associating production information with a mark is eliminated when the information is stored within the mark itself.

It is another aspect of embodiments of the present disclosure to provide a process or method for applying a mark to a container. The process or method can be incorporated into existing manufacturing lines where the mark is applied to the container at a decoration station of a manufacturing line. This has the advantage of preserving the existing speed and efficiency of the manufacturing line since the container does not travel to any additional stations.

The mark can also be applied to the container before or after the decoration station to accommodate more substantial equipment that can, for example, apply a lacquer or varnish with a pigment, allow the varnish to dry, and then activate part of the pigment to produce a mark. Moreover, various actions for applying a mark to a container can be performed in one or more locations. For instance, the container manufacturer can apply a varnish with a pigment to at least a portion of the container body, for example a closed end or dome of a container, at a first location such as a manufacturing plant. Then, a filler can selectively activate some of the pigment to produce a mark at a second location. Additionally, or alternatively, a third entity such as a retailer or brand owner can selectively activate some of the pigment to produce the mark on the filled and seamed container at a third location.

In some embodiments, tab stock or tabs can be coated with a lacquer or varnish that can have a pigment that is subsequently activated to form a mark. The mark can be formed on tab stock where a continuous sheet of stock moves above or below a laser that irradiates portions of the tab stock to create marks. Each portion is subsequently formed into an individual tab. Thus, the mark is created at a predetermined location on each portion so that the mark is located at a predetermined location on the finished tab. Thus, the mark can be positioned in the portion to be subsequently positioned on a planar portion, body, nose, or other location of the tab. Next, in some embodiments, a mark is applied to a tab that has been formed from tab stock but not yet joined to an end closure. It will be appreciated that the present disclosure encompasses embodiments where the mark is applied to a tab after the tab has been joined to an end closure or even after the end closure has been joined to a container body.

It is a further aspect of embodiments of the present disclosure to provide a system to track and trace containers that have a mark. In some embodiments, each mark is unique to the container onto which the mark is applied. A database can receive information regarding the specific mark and specific container from different sources.

One source is the plant where the container is manufactured. The manufacturing plant can supply the database with initial information such as the mark itself, the time and location of manufacturing, the production lot, the container size, etc. Then, at each subsequent location, more information can be sent to the database.

Another source of information is a filler that adds contents to the container and seals the contents within the container with a closure, for instance, an end closure (when the container is a two-piece container or aerosol container) or a roll-on pilfer proof (ROPP) closure (when the container is a threaded bottle). The filler can have a device with a sensor that reads the mark on the container and then sends further information to the database. This information can include the contents of the container, the type of closure (such as an end closure or a ROPP closure) attached to the container, time and location information, production lot, etc.

The consumer is also another source of information. A device with a sensor at the point of sale can read the mark on the container and provide the database with time and location information regarding the sale. In some embodiments, the device can provide information regarding the consumer via the credit card information of the user, an application on the mobile device of the user, etc. With this information, the database can associate the container and the mark with the consumer and/or a mobile device of the consumer.

Once the consumer purchases the container, the consumer may provide further information to the database. Alternatively or in addition to information provided from the point of sale, a consumer can use a mobile device to read the mark on the container and transmit the information to the database to associate the container and the mark with the consumer and/or mobile device.

An application on the mobile device is, in some embodiments, part of the system for tracking and tracing the container where the application receives information from a sensor on the mobile device and causes the mobile device to transmit information to the database. In various embodiments, the application on the mobile device can push reminders or notifications to the consumer that the consumer is within a predetermined distance of a recycling center, that a predetermined time period has elapsed since the purchase of the container, etc.

A consumer can return the container to a collection device where a scanner reads the mark of the container as the container is received. The collection device is another source of information and is in electronic communication with the database, which then sends a signal to an application of a mobile device. This signal can cause any number of actions. The application can change a status of the particular container (e.g., recycled or not recycled), keep track of the total number of containers recycled within a time period, etc. The signal can cause the consumer to receive a credit on the application of the mobile device. The consumer can redeem this credit for currency, buy a product, etc. Once the specific container is received in the collection device, the signal associated with the recycling event can cause a message or post on a social network indicating that the consumer has recycled. Thus, the system can incentivize the consumer to recycle with financial incentives, social incentives, etc. In addition, devices at other locations such as a recycling plant can also read the mark on the container and provide information to the database.

The database can take any number of forms, and the present disclosure encompasses many embodiments of the system for tracking and tracing. For example, a database can be remotely located from any of the other locations and devices of the tracking and tracing system. Alternatively, the database can be part of the mobile device, part of the collection device, etc. Moreover, the database and/or the actions or functions associated with the database can be separated among multiple electronic devices in one or more locations.

In addition to incentivizing an individual consumer, the data received throughout the lifecycle of a container can be used for other purposes. Data from a plurality of containers can indicate recycling rates for containers sold at a geographic location, recycling rates at a collection device for different times of the day, of the week, of the year, etc. A substandard recycling rate can be identified and then, for instance, an advertisement campaign can be targeted at this location. Similarly, a deposit return program used with an application on a mobile device can increase the incentive in terms of credit for a geographic area that has substandard recycling rates. The result of the systems, methods, and apparatuses described herein is an increase in recycling over the current state of the art. The increased recycling rates divert containers from landfills and oceans to recycling plants and reduce the consumption of raw resources used to construct the containers.

One particular embodiment of the present disclosure is an aluminum container having a mark for tracking and tracing the aluminum container, comprising a body with a closed end and a sidewall extending upward from the closed end, an inwardly-oriented neck located at an upper end of the sidewall of the body, wherein the neck has a top portion adapted for interconnection to an end closure; a dome extending into the closed end of the body; and a mark positioned on the dome, wherein the mark comprises container information regarding the aluminum container.

In some embodiments, the mark is one of a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code). In various embodiments, a second mark is positioned on the sidewall of the body and comprises container information, and a third mark is positioned on a tab of the end closure and comprises container information. In some embodiments, the container information comprises information regarding at least one of a unique identifier for the aluminum container, batch information, production lot information, or production shift information.

Another particular embodiment of the present disclosure is a method for marking containers for tracking and tracing the containers, comprising providing a plurality of first containers having a body with a closed end and a sidewall extending upward from the closed end of each first container; applying a first mark to the closed end of each first container, wherein the first mark comprises container information regarding each first container; providing a plurality of second containers having a body with a closed end and a sidewall extending upward from the closed end of each second container; and applying a second mark to the closed end of each second container, wherein the second mark comprises container information regarding each second container, and the second mark is distinct from the first mark.

In various embodiments, the first mark and the second mark are each applied using one of dry offset printing, ink jet printing, digital printing, laser etching, embossing, or debossing. In some embodiments, the method further comprises applying the first mark to the sidewall of each first container and to a tab of each first container.

A further particular embodiment of the present disclosure is a system for tracking and tracing a container, comprising a control system with a memory and a processor, and a database associated with the control system and in electronic communication with a network, the database including a record for a unique mark on a container, the record including information about the container, wherein the database is operable to update the record with data received from the network when the unique mark is scanned by a sensor, and wherein the control system is operable to transmit a signal over the network to a mobile device as part of a deposit return program when the container has been received by a collection device at a recycle center.

The mark may be formed on any portion of the container. In some embodiments, the mark is formed on a closed end of the container. The closed end may optionally comprise a dome. Additionally, or alternatively, the mark is formed on a sidewall of the container. In some embodiments, the mark is formed on an end closure that is attached to an open end of the container.

In some embodiments, the control system is operable to send a signal to the mobile device to cause a display unit of the mobile device to display a message when the mobile device receives the signal from the database. In various embodiments, a credit is transferred to the mobile device when the mobile device receives the signal from the database.

In some embodiments, the database can receive time and location data regarding the reading of the mark by the mobile device along with the container information to the database, and wherein the collection device transfers time and location data regarding the reading of the unique mark by the collection device along with the container information to the database.

In various embodiments, the mobile device comprises an application that causes the mobile device to transfer the container information regarding the unique mark of the container to the database, and the application causes the mobile device to display a message in response to receiving the signal from the database indicating that the container has been received by the collection device as part of a deposit return program.

Another particular embodiment of the present disclosure is a container having a mark for tracking and tracing the container, comprising a body with a closed end and a sidewall extending upward from the closed end and an inwardly-oriented neck located at an upper end of the sidewall of the body, wherein the neck has a top portion adapted for interconnection to an end closure; and a tracking device positioned on the body, wherein the tracking device comprises information regarding the container.

In some embodiments, the container is made from at least one of an aluminum material, a plastic material, or a polystyrene foam material. In various embodiments, the information comprises at least one of a manufacturing date, a container material, a filling date, a unique identifier for the container, batch information, production lot information, or production shift information. In various embodiments, a tracking device is a mark that has an emissivity that is greater than an emissivity of a remaining portion of the dome. In some embodiments, the tracking device is a radio-frequency identification tag that transmits the information upon receiving an electromagnetic interrogation pulse. In various embodiments, the mark is formed by a pigment that has been activated by a laser.

An aspect of the present disclosure is to provide a method for marking containers for tracking and tracing the containers, comprising providing a plurality of tabs formed by a tab press, wherein each tab of the plurality of tabs has a varnish layer; applying a mark to the varnish layer of each tab of the plurality of tabs, wherein each mark is unique to each tab of the plurality of tabs; joining each tab of the plurality of tabs to an end shell in a conversion press to form a plurality of end closures; joining each end closure of the plurality of end closures to a container body to form a plurality of containers, wherein each container of the plurality of containers has the unique mark; scanning the unique mark of a container of the plurality of containers with one or more sensors to generate a scan event having production information; and transmitting the scan event to a database via a network to associate the production information with the container based on the unique mark.

Optionally, the aspect may further comprise forming, by the tab press, a planar portion that is recessed from a body of each tab of the plurality of tabs, wherein the mark is applied to the planar portion.

The method of this aspect may include one or more of the previous embodiments and optionally further comprises activating at least some of a pigment in the varnish layer to apply the mark to each container of the plurality of containers.

The method of this aspect may include one or more of the previous embodiments and optionally further comprises scanning the unique mark of the container of the plurality of containers with a sensor of a mobile device to generate a second scan event having mobile device information; and transmitting the second scan event to the database via the network to associate the container with the mobile device based on the unique mark.

The method of this aspect may include one or more of the previous embodiments and optionally further comprises scanning the unique mark of the container of the plurality of containers with a sensor of a collection device to generate a third scan event having deposit information; and transmitting the third scan event to the database via the network to associate the deposit information with the container based on the unique mark.

The method of this aspect may include one or more of the previous embodiments and, optionally, wherein the unique mark is associated with the container information in a record of the database, wherein the container information includes at least one of batch information, production lot information, or production shift information.

In various embodiments, the unique mark is one of a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code).

Another aspect of the present disclosure is to provide a method for marking containers for tracking and tracing the containers, comprising providing a plurality of container bodies, wherein each container body of the plurality of container bodies has a closed end; applying a mark to the closed end of each of the plurality of container bodies in a container production facility, wherein each mark is unique to each container body of the plurality of container bodies; scanning a unique mark of a container body of the plurality of container bodies with one or more sensors in the container product facility to generate a first scan event having production information; transmitting the first scan event to a database via a network to associate the production information with the container body based on the unique mark.

In some embodiments, the method may further comprise updating the database with a second scan event having information about a product in a container body when the unique mark of the container body of the plurality of container bodies is scanned by a sensor in a fill facility.

Optionally, the method may further comprising transporting the plurality of marked container bodies to a fill facility; filling the plurality of marked container bodies with a product at the fill facility; joining each container body of the plurality of container bodies to an end closure at the fill facility to form a plurality of sealed containers, wherein each sealed container of the plurality of containers has the unique mark; scanning a unique mark of a sealed container of the plurality of containers at the fill facility with one or more sensors to generate a scan event having product information; and transmitting the scan event to the database via the network to associate the product information with the sealed container based on the unique mark.

Optionally, the method may further comprise forming a dome into the closed end of each container body of the plurality of container bodies, wherein the unique mark is located on the dome.

The method of this aspect may include one or more of the previous embodiments and optionally further comprises providing a varnish layer on the closed end of each container body of the plurality of container bodies, wherein the unique mark is applied to the varnish layer.

The method of this aspect may include one or more of the previous embodiments and optionally further comprises activating at least some of a pigment in the varnish layer to apply the mark to each container body of the plurality of container bodies.

The method of this aspect may include one or more of the previous embodiments and optionally further comprises energizing a laser device to emit electromagnetic radiation that activates at least some of the pigment in the varnish layer to change part of the varnish layer from a first color to a second color to apply the mark.

The method of this aspect may include one or more of the previous embodiments and optionally further comprises energizing a laser device to emit electromagnetic radiation that etches part of the closed end of each container body of the plurality of container bodies to apply the mark.

In some embodiments, the mark is one of a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code).

A further aspect of the present disclosure is to provide a system for tracking and tracing a container that includes a body sealed with an end closure, comprising a database configured to receive and store scan events regarding a unique mark on the container; wherein the unique mark is applied to part of the container at a production location, wherein the unique mark is transmitted to the database via a network where the unique mark is associated with production information; wherein the database is operable to receive a first scan event of the unique mark at a filler location recorded by a first sensor and transmitted to the database via the network, wherein the filler location is distinct from the production location, and the end closure is joined with the container body to form the container at the filler location, wherein the first scan event comprises product information associated with the unique mark; and wherein the database is operable to receive a second scan event of the unique mark at a mobile location recorded by a second sensor of a mobile device and transmitted to the database via the network, wherein the mobile location is distinct from the production location and from the filler location, and the database associates the production information and the product information with the mobile device based on the unique mark.

Optionally, the database may receive data from a collection device having a third sensor, wherein a third scan event of the unique mark is recorded by the third sensor and transmitted to the database via the network, and the third scan event comprises deposit information, wherein the database associates the deposit information with the mobile device based on the unique mark.

The system of this aspect may include one or more of the previous embodiments and, optionally, a message is displayed on the mobile device in response to the mobile device receiving a signal from the database via the network, wherein the signal is transmitted based on the deposit event, and the message indicates that the container has been received by the collection device as part of a deposit return program.

The system of this aspect may include one or more of the previous embodiments and, optionally, the unique mark is positioned on a tab that is joined with an end shell at a conversion press to create the end closure.

The system of this aspect may include one or more of the previous embodiments and, optionally, wherein the production information comprises information regarding a portion of a tab stock that is used to form the tab by a tab press, and the product information comprises information regarding contents disposed in the container.

The system of this aspect may include one or more of the previous embodiments and, optionally, the database may receive information about a second unique mark on the container body, wherein the database can store a further scan event of the second unique mark at the filler location recorded by a further sensor and transmitted to the database via the network, wherein the further scan event comprises further production information that includes least one of batch information, production lot information, or production shift information regarding the container body.

It is one aspect of the present disclosure to provide a method for marking containers for tracking and tracing the containers, comprising providing a plurality of container bodies, wherein each container body of the plurality of container bodies has a closed end; forming a dome into the closed end of each container body; printing, by an inkjet printer, a mark onto each dome, wherein each mark is unique and comprises production information; adapting an upper end of a sidewall of each container body to receive an end closure after the container body is filled with a product; scanning the unique mark of a container body of the plurality of containers with a sensor to generate a scan event having time and location information; and transmitting the scan event to a database via a network to associate the time and location information with the container based on the unique mark.

Optionally, the method may further comprise coating an interior surface of each container body by an interior coat spray unit; and printing the mark onto each dome as the interior coat spray unit coats the interior surface of each container body.

The method of this aspect may include one or more of the previous embodiments and optionally further comprises scanning the unique mark of the container of the plurality of containers with a sensor of a mobile device to generate a second scan event having mobile device information; and transmitting the second scan event to the database via the network to associate the container with the mobile device based on the unique mark and the mobile device information.

The method of this aspect may include one or more of the previous embodiments and optionally further comprises scanning the unique mark of the container of the plurality of containers with a sensor of a collection device to generate a third scan event having deposit information; and transmitting the third scan event to the database via the network to associate the deposit information with the mobile device based on the unique mark.

The method of this aspect may include one or more of the previous embodiments and optionally further comprises transporting the container body to a fill location and joining an end closure to the filled container body to form a sealed container, wherein the sealed container has the unique mark.

The method of this aspect may include one or more of the previous embodiments and optionally further comprises scanning the unique mark of the container of the plurality of containers with a sensor at the fill location to generate a fourth scan event having product information; and transmitting the fourth scan event to the database via the network to associate the product information with the container based on the unique mark.

The method of this aspect may include one or more of the previous embodiments and optionally further comprises scanning the unique mark of the container of the plurality of containers with a sensor at a production facility to generate a fifth scan event having production information, wherein the container body of the plurality of container bodies is manufactured at the production facility; and transmitting the fifth scan event to the database via the network to associate the production information with the container based on the unique mark.

Optionally, the methods described herein may further comprise forming the plurality of container bodies by an impact extrusion process. In an exemplary embodiment, impact extrusion is a process utilized to make metallic containers and other articles with unique shapes. The products are typically made from a softened metal slug comprised of one or more of steel, magnesium, copper, aluminum, tin or lead. The container is formed inside the confining die from a cold slug which is contacted by a punch. The force from the punch deforms the metal slug around the punch on the inside, and the die along the outside surface. After the initial shape is formed, the container body is removed from the punch with a counter-punch ejector, and other necking and shaping tools are used to form the container body to a preferred shape. Impact extruded container bodies may be used as aerosol containers and for other products sealed under pressure. In some embodiment, impact extruded container bodies may be necked and threaded to form beverage containers.

Optionally, the methods described herein may further comprise forming the plurality of container bodies by a drawing and ironing process. In an exemplary embodiment, a drawn and ironed container body is formed by a body maker. The body maker receives a metallic cup punched from a metallic sheet by a cupper. The body maker typically comprises a reciprocating punch, a redraw sleeve, a redraw die, one or more ironing rings, and an air stripper. In some embodiments, the body maker may include a doming die. The nose of the punch engages the open end of the metallic cup. The cup is forced linearly by the punch through the redraw die to reduce its diameter and elongate the sidewalls. The punch then forces the redrawn cup through the series of ironing rings to gradually thin and further elongate the sidewalls. Optionally, in some embodiments, the punch then forces the bottom of the container against the compound doming die to form an inward dome and an annular support in the bottom section of the container. The punch and the completed container body reverse direction and the container is separated from the punch by a burst of compressed air, sometimes with the assistance of stripping fingers. The container body is then transported to be necked and flanged.

In some embodiments, the unique mark is one of a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code).

It is another aspect of the present disclosure to provide a method for providing a unique mark on an aluminum body for tracking and tracing the aluminum body, comprising providing a continuous sheet of aluminum material; forming, by a laser, a plurality of unique marks on the continuous sheet of aluminum material; forming the aluminum body from the continuous sheet of aluminum material, wherein a unique mark of the plurality of unique marks is located on a closed end of the aluminum body; scanning the unique mark of the aluminum body with a sensor to generate a first scan event having first time and first location information; and transmitting the first scan event to a database via a network to associate the first time and first location information with the aluminum body based on the unique mark.

Optionally, the method may further comprise moving the continuous sheet of aluminum material at a constant speed as the laser forms the plurality of unique marks on the continuous sheet of aluminum material.

In some embodiments, the laser etches the plurality of unique marks into the continuous sheet of aluminum material.

Alternatively, in other embodiments, the laser alters a surface of the continuous sheet of aluminum material.

Additionally, or alternatively, the laser may alter or activate a coating on the continuous sheet of aluminum material.

In some embodiments, the laser alters or activates a pigment in the coating on the continuous sheet of aluminum material.

Optionally, the method may further comprise moving the continuous sheet of aluminum material at a non-constant speed, wherein the continuous sheet of aluminum material slows down or stops for a dwell period as the laser forms the plurality of unique marks on the continuous sheet of aluminum material.

Optionally, the method may further comprise forming the aluminum body by a drawing and ironing process.

In some embodiments, the aluminum body comprises a tapered sidewall with an open end that has a curl, the open end comprising a first diameter that is greater than a second diameter of the closed end.

Alternatively, in other embodiments, the aluminum body comprises a cylindrical sidewall extending upwardly from the closed end, wherein an open end of the aluminum body is adapted to be sealed with an end closure after the aluminum body is filled with a product.

The method of this aspect may include one or more of the previous embodiments and optionally comprises filling the aluminum body with a product at a fill facility and sealing the open end with the end closure to form a sealed container.

In some embodiments, the method optionally comprises scanning the unique mark with a sensor at the fill facility to generate a second scan event having second time and second location information, and transmitting the second scan event to the database via the network to associate the second time and the second location information with the aluminum body based on the unique mark.

The method of this aspect may include one or more of the previous embodiments and transmitting the second scan event to the database further comprises associating the product stored in the sealed container with the aluminum body.

The method of this aspect may include one or more of the previous embodiments and transmitting the first scan event to the database further comprises associating production information with the aluminum body, the production information including one or more of a serial number of the continuous sheet of aluminum material, a supplier of the continuous sheet of aluminum material, identification of coating, inks or lubricants applied to the continuous sheet of aluminum material or to the aluminum body, and identification of each piece of equipment used to form the aluminum body. In some embodiments, the production information may include a location (such as "x" and "y" coordinates) where the unique mark was formed on the continuous sheet of aluminum material by the laser.

The method of this aspect may include one or more of the previous embodiments and optionally further comprises forming a dome on the closed end of the aluminum body such that the unique mark is located on the dome.

The method of this aspect may include one or more of the previous embodiments and, optionally, wherein the laser forms the plurality of marks by etching the continuous sheet of aluminum material, and the etching physically changes part of the continuous sheet of aluminum material from a first emissivity to a second emissivity to form the plurality of unique marks.

The method of this aspect may include one or more of the previous embodiments and optionally further comprises applying one of a lacquer layer or a varnish layer to the continuous sheet of aluminum material to preserve the plurality of unique marks.

It is a further aspect of the present disclosure to provide a method for marking containers for tracking and tracing the containers, comprising providing a plurality of container bodies, wherein each container body of the plurality of container bodies has a closed end; applying a varnish layer to the closed end of each container body, wherein the varnish layer comprises a pigment; activating, with a laser device, some of the pigment in the varnish layer to produce a mark on each closed end, wherein each mark is unique and comprises production information; scanning the unique mark of a container body of the plurality of container bodies with a sensor to generate a first scan event having time and location information; and transmitting the scan event to a database via a network to associate the time and location information with the container body based on the unique mark.

In some embodiments, the sensor is located at a production facility that produced the container body. The sensor may optionally be associated with a necker or a flanger of the production facility and the production information may comprise an identity (or a serial number) of the neck or an identity (or a serial number) of the flanger.

Optionally, the method may further comprise forming a dome into each closed end, wherein each unique mark is located on each dome.

The method of this aspect may include one or more of the previous embodiments and optionally further comprises energizing the laser device to emit electromagnetic radiation that activates at least some of the pigment in the varnish layer to change part of the pigment from a first color to a second color to apply the mark.

The method may include one or more of the previous embodiments and optionally further comprises transporting the container body to a filler and joining an end closure to the container body to form a sealed container, wherein the sealed container has the unique mark.

The method may further comprise scanning the unique mark of the container body at the filler to generate a second scan event having second time, second location and product information, and transmitting the second scan event to the database via the network to associate the second time, second location and product information with the container body based on the unique mark.

In some embodiments, the unique mark is one of a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code).

It is another aspect of the present disclosure to provide a system for tracking and tracing a container, comprising a database configured to receive and store scan events regarding a unique mark on the container; a production location where the unique mark is applied to part of the container, wherein the unique mark is transmitted to the database via a network, and the unique mark comprises production information.

The database is operable to receive data of a first scan event of the unique mark from a first sensor at a filler location that is transmitted to the database via the network, wherein the filler location is distinct from the production location, and an end closure is joined with a container body to form the container at the filler location, wherein the first scan event comprises container information associated with the unique mark.

Additionally, or alternatively, the database is operable to receive data of a second scan event of the unique mark from a second sensor of a mobile device and transmitted to the database via the network, wherein the mobile device is at a location distinct from the production location and from the filler location, and the database associates the container information with the mobile device based on the unique mark.

Optionally, the database is operable to receive data of a third scan event from a third sensor of a collection device, wherein the third scan event of the unique mark is recorded by the third sensor and transmitted to the database via the network, and the third scan event comprises deposit information, wherein the database associates the deposit information with the mobile device based on the unique mark.

The system of this aspect may include one or more of the previous embodiments and, optionally, the database is operable to transmit a signal by the network to the mobile device, wherein the signal causes a message to be displayed on the mobile device wherein the signal is transmitted based on the deposit event and the third scan, and the message indicates that the container has been received by the collection device as part of a deposit return program.

The system of this aspect may include one or more of the previous embodiments and, optionally, wherein the container comprises a dome in a closed end, and the unique mark is positioned on the dome.

The system of this aspect may include one or more of the previous embodiments and, optionally, wherein the production information comprises at least one of batch information, production lot information, or production shift information regarding the container body, and the container information comprises information regarding contents disposed in the container.

The system of this aspect may include one or more of the previous embodiments and optionally may further comprise a second unique mark on a tab of an end closure of the container, wherein a further scan event of the second unique mark at the filler location is recorded by a further sensor and transmitted to the database via the network, wherein the further scan event comprises further production information regarding a portion of a tab stock that is used to form the tab.

It is an aspect of the present disclosure to provide a method for tracking and tracing containers during the production, distribution, sale, and to end of life collection of the containers, comprising providing a plurality of containers, wherein each container of the plurality of containers comprises a unique mark, and the unique mark comprises production information; scanning the unique mark of a container of the plurality of containers with a sensor at a production facility to generate a first scan event having first time and first location information; and transmitting the first scan event to a database via a network, wherein the database is operable to associate the first time and first location information with the container and with the production information based on the unique mark.

Optionally, the method may further comprise marking a tab of an end closure of the container at the production facility to provide the unique mark on the container, wherein the production information includes information about a sheet of a tab stock that is used to form the tab.

The method of this aspect may include one or more of the previous embodiments and, optionally, the production information comprises information about a portion of a tab stock used to form the tab, the supplier of the tab stock, or a serial number or a batch number of a coil of the tab stock.

The method of this aspect may include one or more of the previous embodiments and optionally further comprises marking a closed end of a container body of the container at the production facility to provide the unique mark on the container, wherein the production information includes at least one of batch information, production lot information, or production shift information regarding the container body.

The method of this aspect may include one or more of the previous embodiments and optionally further comprises forming, by a laser, the unique mark on a continuous sheet of aluminum material at the production facility; and forming an aluminum body from the continuous sheet of aluminum material, wherein the unique mark is on a closed end of the aluminum body.

The method of this aspect may include one or more of the previous embodiments and optionally further comprises forming, by the laser, the unique mark on the continuous sheet of aluminum material as the sheet is stationary for a dwell time.

The method of this aspect may include one or more of the previous embodiments and optionally further comprises forming, by the laser, the unique mark on the continuous sheet of aluminum material as the sheet is continuously moving.

The method of this aspect may include one or more of the previous embodiments and optionally further comprises forming, by the laser, the unique mark by activating a pigment on the continuous sheet of aluminum material.

The method of this aspect may include one or more of the previous embodiments and, optionally, the aluminum body has a sidewall with an open end adapted to receive an end closure to form the container.

The method of this aspect may include one or more of the previous embodiments and, optionally, the aluminum body is the container, and the container has an open end and a closed end.

The method of this aspect may include one or more of the previous embodiments and optionally further comprises printing, by an inkjet print head, the unique mark on a closed end of a container body of the container at the production facility.

The method of this aspect may include one or more of the previous embodiments and optionally further comprises forming the mark on the container as the container is positioned in an interior coat spray unit as the interior coat spray unit coats the interior surface of each container body.

Optionally, the methods described herein may further comprise forming the plurality of containers by a drawing and ironing process.

Optionally, the methods described herein may further comprise forming the plurality of containers by an impact extrusion process.

It is a further aspect of the present disclosure to provide a method for tracking and tracing aluminum bodies during the production, distribution, sale, and to end of life collection of the aluminum bodies, comprising providing a continuous sheet of aluminum material at a production facility; forming, by a laser, a plurality of unique marks on the continuous sheet of aluminum material; forming a plurality of aluminum bodies from the continuous sheet of aluminum material, wherein each aluminum body of the plurality of aluminum bodies has a unique mark of the plurality of unique marks located on a closed end of the aluminum body, and the unique mark comprises production information; scanning the unique mark of the aluminum body with a sensor to generate a first scan event having first time and first location information; and transmitting the first scan event to a database via a network, wherein the database is operable to associate the first time and first location information with the aluminum body and with the production information based on the unique mark.

Optionally, the production information may include information about a supplier of the continuous sheet of aluminum material, a serial number of the continuous sheet of aluminum material, a composition of the continuous sheet of aluminum material, and/or coordinates of a portion of the continuous sheet of aluminum material used to form the aluminum body.

Optionally, the method may further comprise forming the aluminum body by a drawing and ironing process from an aluminum cup cut from the continuous sheet of aluminum material.

The method of this aspect may include one or more of the previous embodiments and optionally further comprises transmitting a second scan event to said database via said network, said second scan event comprising second time and second location information and identification of a bodymaker that forms said aluminum body.

The method of this aspect may include one or more of the previous embodiments and, optionally, the sensor is located at a first bodymaker of a plurality of bodymakers within the production facility.

The method of this aspect may include one or more of the previous embodiments and optionally further comprises forming a dome on the closed end of the aluminum body such that the unique mark is located on the dome.

The method of this aspect may include one or more of the previous embodiments and optionally further comprises necking a sidewall of the aluminum body and adapting an upper end of the sidewall to receive an end closure to form a sealed container.

The method of this aspect may include one or more of the previous embodiments and optionally further comprises transmitting a third scan event to said database via said network, said third scan event comprising third time and third location information and identification of a flanger that adapts the upper end to receive the end closure.

The method of this aspect may include one or more of the previous embodiments and, optionally, the aluminum body is a tapered aluminum cup with an open end.

The method of this aspect may include one or more of the previous embodiments and, optionally, the laser physically changes parts of the continuous sheet of aluminum material from a first emissivity to a second emissivity to form the plurality of unique marks.

The method of this aspect may include one or more of the previous embodiments and optionally further comprises applying a lacquer layer to the continuous sheet of aluminum material to preserve the plurality of unique marks.

It is another aspect of the present disclosure to provide a method for tracking and tracing containers during the production, distribution, sale, and to end of life collection of the containers, comprising providing a plurality of containers, wherein each container of the plurality of containers has at least one of a closed end or a tab; forming a unique mark on at least one of the closed end or the tab of a container of the plurality of containers with an ink, a pigment, or laser etching at a production facility to produce the unique mark that comprises production information; scanning the unique mark of the container with a sensor at the production facility to generate a first scan event having first time and first location information; transmitting the first scan event to a database via a network, wherein the database is operable to associate the first time and first location information with the container and with the production information based on the unique mark; scanning the unique mark of the container with a sensor at a filler facility to generate a second scan event having second time and second location information; transmitting the second scan event to the database via the network, wherein the database is operable to associate the second time and second location information with the container based on the unique mark; scanning the unique mark of the container with a sensor at a distribution facility to generate a third scan event having third time and third location information; transmitting the third scan event to the database via the network, wherein the database is operable to associate the third time and third location information with the container based on the unique mark; scanning the unique mark of the container with a sensor at a retailer facility to generate a fourth scan event having fourth time and fourth location information; transmitting the fourth scan event to the database via the network, wherein the database is operable to associate the fourth time and fourth location information with the container based on the unique mark; scanning the unique mark of the container with a sensor of a mobile device to generate a fifth scan event having mobile device information and fifth time and fifth location information; transmitting the fifth scan event to the database via the network, wherein the database is operable to associate the container with the mobile device and with the fifth time and fifth location information based on the unique mark and the mobile device information; scanning the unique mark of the container with a sensor of a collection device to generate a sixth scan event having deposit information and sixth time and sixth location information; and transmitting the sixth scan event to the database via the network, wherein the database is operable to associate the mobile device with the deposition information to associate the sixth time and sixth location information with the container based on the unique mark.

The method of this aspect may include one or more of the previous embodiments and, optionally, the unique mark is formed with the pigment by applying a varnish layer to the closed end of each container, wherein the varnish layer comprises the pigment; and activating, with a laser device, some of the pigment in the varnish layer to produce the unique mark on each closed end.

The method of this aspect may include one or more of the previous embodiments and, optionally, the unique mark is formed with the ink by coating an interior surface of each container by an interior coat spray unit; and forming, by an inkjet printer, the unique mark with the ink on the closed end as the interior coat spray unit coats the interior surface of each container.

The method of this aspect may include one or more of the previous embodiments and, optionally, the unique mark is formed with the laser etching by forming, by a laser, at least one unique mark on a continuous sheet of aluminum material; and forming a container body of the container from the continuous sheet of aluminum material, wherein the unique mark is positioned on the closed end of the container body of the container.

The method of this aspect may include one or more of the previous embodiments and, optionally, the unique mark is formed with the laser etching by forming, by a laser, at least one unique mark on the tab of an end closure; and joining the end closure with a container body to form the container.

The method of this aspect may include one or more of the previous embodiments and, optionally, the sensor at the production facility is associated with a necker positioned downstream of an interior coat spray unit, and the necker is configured to form a neck on the container.

The method of this aspect may include one or more of the previous embodiments and, optionally, the unique mark is one of a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code).

It is another aspect of the present disclosure to provide a method for tracking and tracing containers during the production, distribution, sale, and to end of life collection of the containers, comprising providing a plurality of container bodies, wherein each container body of said plurality of container bodies has a closed end; forming a mark on said closed end of each container body with an ink or a pigment at a production facility to produce a unique mark that comprises production information; scanning said unique mark of a container body of said plurality of container bodies with a sensor at the production facility to generate a first scan event having first time and first location information; transmitting said first scan event to a database via a network, wherein said database is operable to associate said first time and first location information with said container body and with said production information based on said unique mark.

Another aspect is a system for tracking and tracing containers during the production, distribution, sale, and to end of life collection of the containers, comprising:

a sensor at a production facility that is operable to scan a unique mark on each of a plurality of containers being produced at the production facility, wherein the sensor generates a first scan event when the sensor scans a unique mark of a first container of the plurality of containers, the first scan event having first time and first location information; and a control system with a memory, a processor, and a database stored in the memory, the database including records associated with the unique mark of each of the plurality of containers, each record comprises production information for a container, wherein the database is operable to receive the first scan event via a network connection to the sensor, wherein the database is operable to associate the first time and first location information with the first container based on the unique mark.

In some embodiments, the system further comprises a marker to mark a tab of an end closure of the container at the production facility to provide the unique mark on the container, wherein the production information includes information about a sheet of a tab stock that is used to form the tab.

Optionally, the system further comprises a marker to mark a closed end of a container body of the container at the production facility to provide the unique mark on the container, wherein the production information includes at least one of batch information, production lot information, or production shift information regarding the container body.

The system may include one or more of the previous embodiments, and optionally further comprises a laser to form the unique mark on a continuous sheet of aluminum material at the production facility.

In some embodiments, the system further comprises a cupper to cut a cup with the unique mark from the continuous sheet of aluminum material.

The system may further comprise a bodymaker to form an aluminum body from a cup cut from the continuous sheet of aluminum material such that the unique mark is on a closed end of the aluminum body.

In some embodiments, the aluminum body has a sidewall with an open end adapted to receive an end closure to form the container. Optionally, the system further comprises a necker to reduce a diameter of the open end of the aluminum body. In some embodiments, the system includes a flanger to form a flange at the open end, the flange adapted to receive the end enclosure.

Optionally, the aluminum body is the container, and the container has an open end and a closed end. Accordingly, the aluminum body may be referred to as an aluminum cup, or a tapered cup.

The system may include one or more of the previous embodiments and may optionally further comprise an inkjet print head to form the unique mark on a dome of a container body of the container at the production facility.

In some embodiments, the system further comprises a sensor at an upstream side or a downstream side of all equipment used to form the container bodies and the end closures in the production facility. Accordingly, the system may include at least one sensor associated with each cupper, each bodymaker, each decorator, each necker, each flanger, each tab press, and each conversion press.

Still another aspect of the present disclosure is a system to track and trace aluminum bodies during the production, distribution, sale, and to end of life collection of the aluminum bodies, comprising: an uncoiler to feed a continuous sheet of aluminum material into a cupper at a production facility; a laser to form a plurality of unique marks on the continuous sheet of aluminum material; a bodymaker to form a plurality of aluminum bodies from cups cut from the continuous sheet of aluminum material by the cupper, wherein each aluminum body of the plurality of aluminum bodies has a unique mark of the plurality of unique marks located on a closed end of the aluminum body, and the unique mark comprises production information; a scanner to scan the unique mark of an aluminum body to generate a first scan event having first time and first location information; and a control system with a processor, a memory, and a database stored in the memory, the database operable to receive the first scan event via a network connect to the sensor, wherein said database is operable to associate the first time and first location information with the aluminum body and with the production information in a record of the database based on the unique mark.

The bodymaker is operable to form the aluminum body by a drawing and ironing process from the cup cut from the continuous sheet of aluminum material.

In some embodiments, the bodymaker is operable to form a dome on the closed end of the aluminum body such that the unique mark is located on the dome.

The system may include one or more of the previous embodiments, and may further comprise a necker to neck a sidewall of the aluminum body. In some embodiments, a sensor is associated with the necker. The sensor is operable to scan the unique mark on the aluminum body and send information to the database. In this manner, the database can update the record for the aluminum body with an identity (such as a serial number) of the necker.

In some embodiments, the system further comprises a flanger to form a flange at an upper end of the sidewall of the aluminum body that is adapted to receive an end closure to form a sealed container.

In some embodiments, a sensor is associated with the flanger. The sensor is operable to scan the unique mark on the aluminum body and send information to the database. In this manner, the database can update the record for the aluminum body with an identity (such as a serial number) of the flanger.

Optionally, the aluminum body is a tapered aluminum cup with an open end.

The system may include one or more of the previous embodiments, and optionally the laser physically changes parts of the continuous sheet of aluminum material from a first emissivity to a second emissivity to form the plurality of unique marks.

In some embodiments, the system includes an applicator to apply a lacquer layer to the continuous sheet of aluminum material to preserve the plurality of unique marks.

Still another aspect of the present disclosure is a system for tracking and tracing containers during the production, distribution, sale, and to end of life collection of the containers, comprising a marker at a production facility to form a unique mark on at least one of a closed end or a tab of a container of a plurality of containers, the marker operable to form the unique mark with an ink, a pigment, or a laser to produce the unique mark that comprises production information; a sensor to scan the unique mark of the container at the production facility to generate a first scan event having first time and first location information; a control system with a processor, a memory, and a database stored in the memory, the database operable to receive the first scan event via a network connection to the scanner, wherein the database is operable to associate the first time and first location information with the container and with the production information based on the unique mark.

In some embodiments, the system further comprises a sensor at a filler facility to scan the mark and generate a second scan event having second time and second location information, wherein the scanner can transmit the second scan event to the database via the network, wherein the database is operable to associate the second time and second location information with the container based on the unique mark.

Additionally, or alternatively, the system may further comprise a sensor at a distribution facility to scan the unique mark and generate a third scan event having third time and third location information, wherein the scanner can transmit the third scan event to the database via the network, wherein the database is operable to associate the third time and third location information with the container based on the unique mark.

In some embodiments, the system further comprises a sensor at a retailer facility to generate a fourth scan event having fourth time and fourth location information, wherein the sensor can transmit the fourth scan event to the database via the network, wherein the database is operable to associate the fourth time and fourth location information with the container based on the unique mark.

Optionally, the system may further comprises a sensor of a mobile device to generate a fifth scan event having mobile device information and fifth time and fifth location information, wherein the sensor can transmit the fifth scan event to the database via the network, wherein the database is operable to associate the container with the mobile device and with the fifth time and fifth location information based on the unique mark and the mobile device information.

In some embodiments, the system may further comprise a sensor of a collection device to generate a sixth scan event having deposit information and sixth time and sixth location information, wherein the sensor can transmit the sixth scan event to the database via the network, wherein the database is operable to associate the mobile device with the deposition information to associate the sixth time and sixth location information with the container based on the unique mark.

The system may include one or more of the previous embodiments, and optionally the marker forms the unique mark with the pigment by: applying a varnish layer to the closed end of each container, wherein the varnish layer comprises the pigment; and activating, with a laser device, some of the pigment in the varnish layer to produce the unique mark on each closed end.

In some embodiments, the marker forms the unique mark with the ink by: coating an interior surface of each container by an interior coat spray unit; and forming, by an inkjet printer, the unique mark with the ink on the closed end as the interior coat spray unit coats the interior surface of each container.

Optionally, the marker forms the unique mark with the laser by: forming at least one unique mark on a continuous sheet of aluminum material; and forming a container body of the container from the continuous sheet of aluminum material, wherein the unique mark is positioned on the closed end of the container body of the container.

Additionally, or alternatively, the system may comprise the marker forming the unique mark with the laser by: forming at least one unique mark on the tab of an end closure, wherein the end closure is subsequently joined with a container body to form the container.

The system may include one or more of the previous embodiments, and optionally the unique mark is one of a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code).

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The systems, methods, and apparatus of the present disclosure may be used to apply marks to workpieces and packaging formed of any material. More specifically, the systems, methods and apparatus of the present disclosure may be used to mark, track, and trace workpieces, packaging, and container bodies formed of paper and other fibrous materials, plastic, glass, metal, and other materials known to those of skill in the art.

The terms "metal" or "metallic" as used hereinto refer to any metallic material that may be used to form a container, including without limitation aluminum, steel, tin, tin coated steel, copper, and any combination thereof.

Although generally referred to herein as a "container body" or a "metallic container," it should be appreciated that the methods and apparatus described herein may be used in the production of metallic workpieces and metal packaging of any size, shape, or type which are used for any purpose. In some embodiments, the metallic workpieces include without limitation a metallic beverage bottle, a metallic beverage container, an aluminum bottle, a two-piece container, a two-piece can, a can, an aerosol container, a three-piece container (for example, a food can), or a metal cup (such as a tapered cup). As used herein, a "container body" can be formed into any type of container or vessel for a product. The product may be a liquid or a solid. In some embodiments, the product may be a beverage or a food. The produce may also be a personal care item such as deodorant, sunscreen, hair spray, and the like. In some embodiments, the product may be from a plant.

A container body generally includes a closed end or endwall, a sidewall, and an open end. In some embodiments the closed end includes a dome. Alternatively, the closed end may be generally planar. The sidewall may be generally cylindrical. Alternatively, the sidewall is tapered such that the open end has a larger diameter than the closed end.

The terms "sheet" and "continuous sheet" are used herein to refer to a piece of material that has a length greater than 100 feet. The sheet may also be referred to as continuous web of material. The sheet is rolled to form a coil.

The systems and methods of the present disclosure may be used with a container body formed by any method known to one of skill in the art. For example, a container body may be formed by a draw and ironing process or by an impact extrusion process. Alternatively, a container body can be formed by a blow molding process or by injection molding.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, angles, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

Unless otherwise indicated, the term "substantially" indicates a difference of from 0% to 5% of the stated value is acceptable.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated herein and constitute a part of the specification, illustrate embodiments of the disclosure and together with the Summary given above and the Detailed Description given below serve to explain the principles of these embodiments. In certain instances, details that are not necessary for an understanding of the disclosure or that render other details difficult to perceive may have been omitted. It should be understood, of course, that the present disclosure is not necessarily limited to the particular embodiments illustrated herein. Additionally, it should be understood that the drawings are not necessarily to scale.

FIG. 8 is a schematic for a process for tracking and tracing a container according to an embodiment of the present disclosure.

Figure 1A:
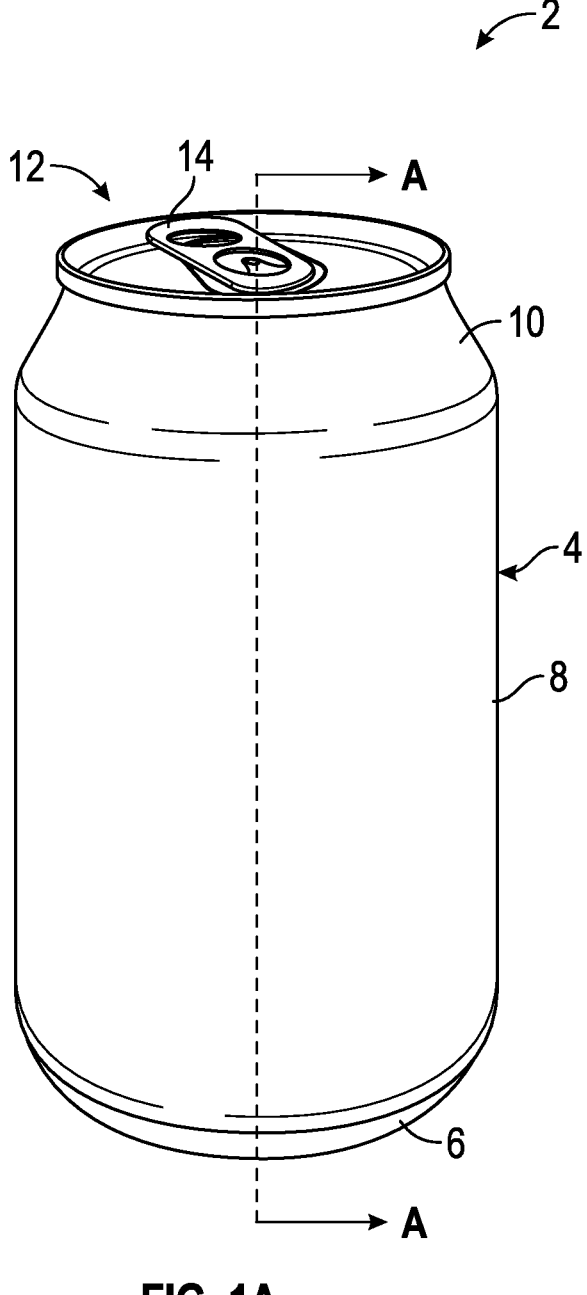
FIG. 1A is a perspective view of a container according to an embodiment of the present disclosure.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

To assist in the understanding of one embodiment of the present disclosure the following list of components and associated numbering found in the drawings is provided herein:

| Number | Component |
| --- | --- |
| 2 | Container |
| 4 | Body |
| 6 | Closed End |
| 8 | Sidewall |
| 10 | Neck |
| 12 | End Closure |
| 14 | Tab |
| 16 | Seam |
| 18 | Dome |
| 20 | Varnish |
| 22 | Mark |
| 24 | Rivet |
| 26 | Rivet Island |
| 28 | Rotational Guide |
| 30 | Nose |
| 32 | Tail |
| 34 | Planar Portion |
| 36 | Body |
| 38 | Opening |
| 40 | Central Panel |
| 42 | Secondary Vent |
| 44 | Tab Stock |
| 45 | Interior Coat Spray Unit |
| 46 | Light Source |
| 47 | Inkjet Print Head |
| 48 | Light |
| 49 | Ink |
| 50 | Portions |
| 52 | Applicator |
| 54 | Lacquer |
| 56 | Marking Process |
| 58 | Provide First Container |
| 60 | Apply First Mark |
| 62 | Provide Second Container |
| 64 | Apply Second Mark |
| 66 | Fill Containers |
| 68 | Sell Containers |
| 70 | Recycle Containers |

-continued

| Number | Component |
| --- | --- |
| 72 | Marking Process |
| 74 | Provide Container |
| 76 | Apply Varnish |
| 78 | Apply Electromagnetic Radiation |
| 80 | Fill Containers |
| 82 | Sell Containers |
| 84 | Recycle Containers |
| 86 | Database |
| 88 | Production Facility |
| 90 | Production Sensor |
| 92 | Filler Facility |
| 94 | Filler Sensor |
| 96 | Distribution Facility |
| 98 | Distribution Sensor |
| 100 | Seller Facility |
| 102 | Seller Sensor |
| 104 | Mobile Device |
| 106 | Sensor |
| 108 | Collection Device |
| 110 | Sensor |
| 112 | Scanning Process |
| 114 | Scanning Mark |
| 116 | Transmitting Information |
| 118 | Associating Container |
| 120 | Scanning Mark |
| 122 | Transmitting Information |
| 124 | Transmitting Signal |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments of marks, containers, and methods of tracking and tracing, it should be understood that the detailed description is to be construed as exemplary only and does not describe every possible embodiment since describing every possible embodiment would be impractical, if not impossible. Numerous alternative embodiments can be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Referring now to FIG. 1A, a perspective view of an exemplary container 2 is provided. The container 2 has a body 4 that defines an enclosed space in which to receive contents such as beverages and foodstuffs. Specifically, a cylindrically-shaped sidewall 8 extends upward from a closed end 6. A neck 10 is positioned at an upper portion of the sidewall 8, and an end closure 12 is secured to the neck 10. During the filling process, the contents are placed in the body 4 of the container 2, and then the end closure 12 is secured to the body 4 to seal the contents within the container 2. The end closure 12 has a tab 14 that is operable to define an opening in the container 2 to allow a consumer to access the contents of the container 2.

In some embodiments the metallic container is a two-piece container with a cylindrical body having one open end sealed by one end closure. Optionally, a mark 22 (as described herein) may be formed on one or more of the end closure and the cylindrical body. In some embodiments, the mark is formed only on the cylindrical body of a two-piece container.

In other embodiments, the metallic container is a three-piece container that has a cylindrical body with two open ends, each open end being sealed by an end closure. In this embodiment, the mark may be formed on one or more of a first end closure, a second end closure, and a cylindrical body extending between the first and second end closures. In some embodiments, a mark is formed only on a cylindrical body of a three-piece container.

In various embodiments, the container is made from a metal, such as aluminum, which can be recycled an infinite number of times without the material losing structural integrity. However, it will be appreciated that the present disclosure encompasses embodiments where the container is made from materials such as plastic, Styrofoam, or any other material used to make a container. Moreover, the present disclosure encompasses different containers such as tapered cups, containers with pull tabs or pour openings, etc. In this sense, a tapered cup can include a unique mark and have an open end. The unique mark can be scanned throughout the lifecycle of the tapered aluminum cup, and an end user may fill the tapered aluminum cup with contents for immediate use.

Figure 1B:
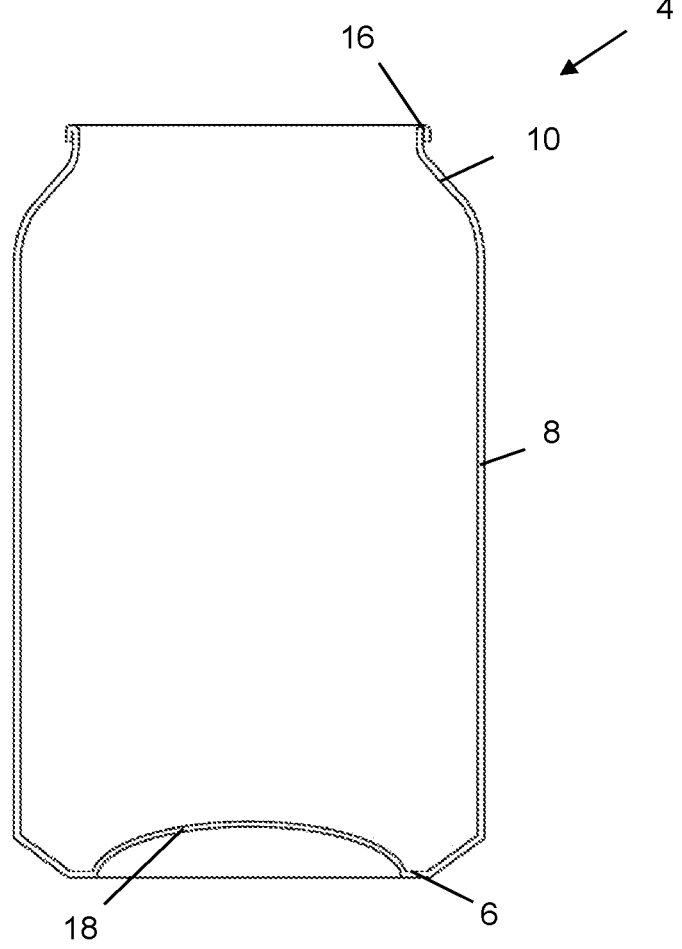
FIG. 1B is a cross-sectional view of a container body taken along line A-A in FIG. 1A according to an embodiment of the present disclosure.

Referring now to FIG. 1B, a cross-sectional view of the body 4 of the container in FIG. 1A taken along line A-A is provided. The body 4 is depicted without the end closure, and the upper end of the neck 10 of the container can form a double seam 16 with the end closure to seal the contents within the container. Also shown in FIG. 1B is a dome 18 extending into the closed end 6 of the body 4. The dome 18 is optional and helps the container withstand higher internal pressures. The dome 18 may, in some embodiments, serve as the location to apply the mark 22 which is used for tracking and tracing the container throughout the lifecycle of the container. Locating the mark on the dome 18 is advantageous because this recessed portion of the container is generally protected from abrading or wearing forces that may render the mark incapable of being read by a sensor. In addition, when containers are crushed to a smaller size, they are typically crushed along a length of the container, leaving the dome 18 intact and substantially unchanged. However, it will be appreciated that embodiments can include the same mark and/or a different mark applied to, for example, the sidewall, the end closure, the tab, etc. Further still, a mark can be applied to the closed end of a container even if the closed end does not have a dome shape. For instance, a mark can be applied to the closed end of a tapered aluminum cup.

Figure 2A:
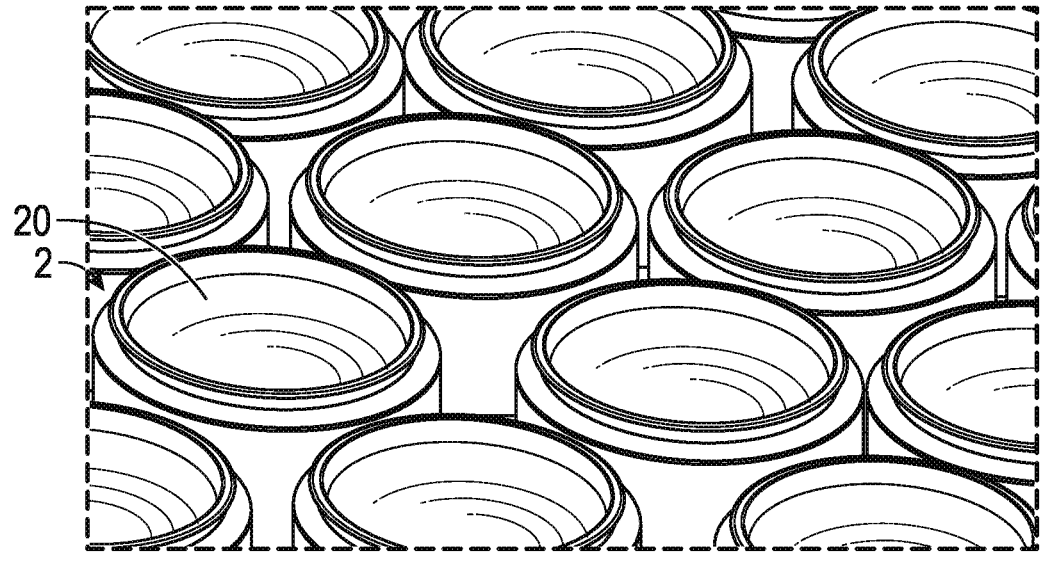
FIG. 2A is a perspective view of a varnish layer on a dome of a container according to an embodiment of the present disclosure.
Figure 2B:
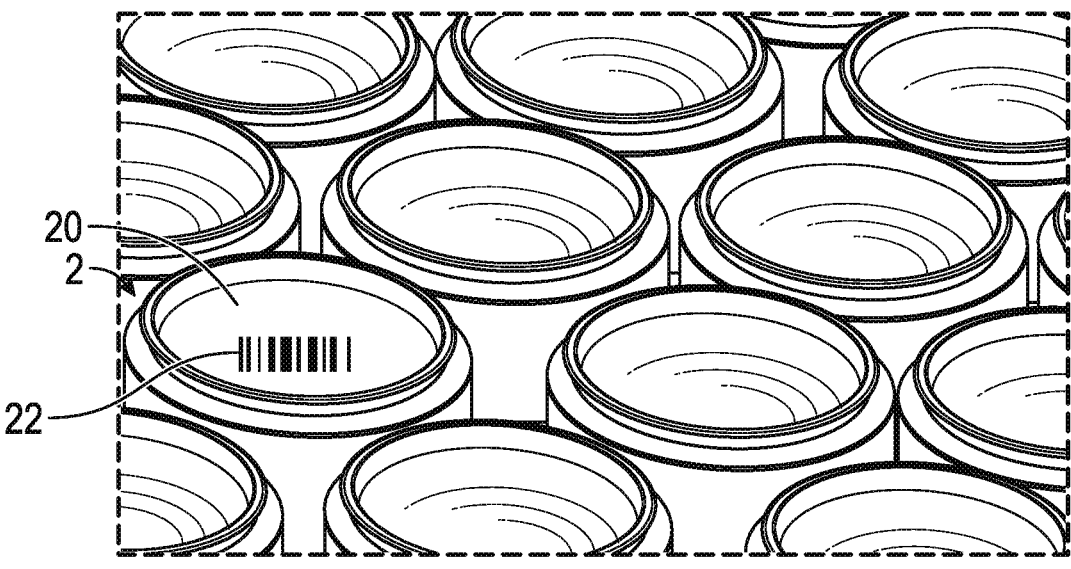
FIG. 2B is a perspective view of a mark on the dome of the container of FIG. 2A according to an embodiment of the present disclosure.

Referring now to FIGS. 2A and 2B, perspective views of the domes of containers are provided. FIG. 2A shows a varnish 20 applied to the dome of a container 2, and FIG. 2B shows a mark 22 applied to the dome of the container 2. In this embodiment, the varnish 20 can have a pigment component which is activated by a laser to create the shape of a mark 22. Specifically, the varnish 20 and/or pigment applied to the dome has an initial color in terms of hue, value, and/or saturation. Then, a laser is directed to part of the pigment to change a first color to a second color in terms of hue, value, and/or saturation or in terms of emissivity. Thus, the laser can selectively activate parts of the varnish 20 and/or pigment to produce the shape of the mark 22. It will be appreciated that the varnish itself can be changed from a first color to a second color without the inclusion of a pigment. Conversely, it will be appreciated that a pigment can be directly applied to part of a container and then selectively activated from a first color to a second color without the use of a varnish or prior to the application of a varnish. Other ways of applying a mark 22 are described in further detail herein.

Figure 3A:
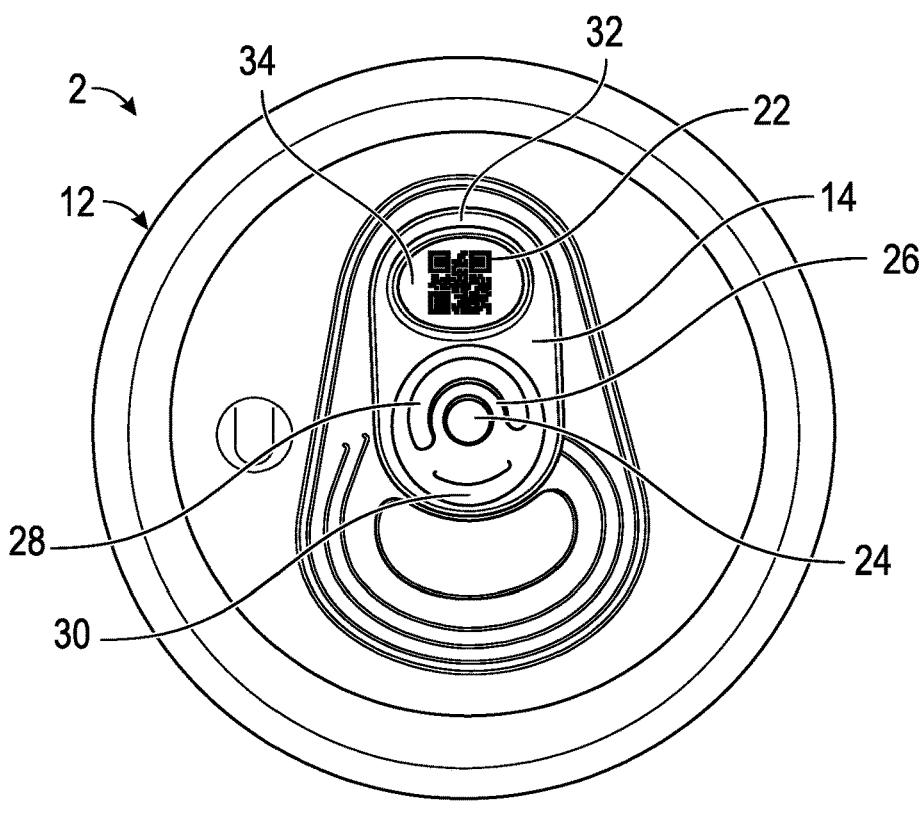
FIG. 3A is a top plan view of a container with a mark according to an embodiment of the present disclosure.

Referring now to FIGS. 3A-3D, various views of marks 22 on the end closures 12 of containers 2 are provided. Specifically, FIG. 3A is a top plan view of a mark 22 on a tab 14 of an end closure 12 for a container 2. In some embodiments, the marks 22 are formed on the end closures 12 before the end closures are joined to a container body. Additionally, or alternatively, the marks 22 (or some of the marks) may be formed on the end closures after the end closures are joined to a container body.

The tab 14 can be made from tab stock during a manufacturing process, and the tab 14 can have several features and components. The tab 14 is generally attached to the rest of the end closure 12 with a rivet 24 that extends through a rivet island 26 of the tab 14. The rivet 24 allows the tab 14 to rotate relative to the rest of the end closure 12 if desired. In addition, a rotational guide 28 can interact with other features of the end closure 12 to limit rotation of the tab 14.

A nose 30 extends from the rivet island 26, and the nose 30 is configured to drive into a panel that defines the opening of the container 2. A tail 32 is positioned at an opposing end of the tab 14 from the nose 30, and the tail 32 is configured to be lifted by a user, which then pivots the tab 14 about the rivet 24 to drive the nose 30 into the panel. In turn, the nose 30 shears a score line that at least partially defines the panel and creates an opening in the end closure 12 for the user to access the contents of the container 2.

The tail 32 shown in FIG. 3A is joined to a planar portion 34 of the tab 14, and the mark 22 can be located on this planar portion 34 for scanning and other functions described herein. The location of the mark 22 is advantageous because the planar portion 34 is located below other portions of the tab 14. Therefore, the planar portion 34 is less likely to be damaged if the container is crushed or if the container experiences other types of damage during its lifecycle. Moreover, even when the tab 14 is actuated, the tab 14 is returned to approximately its original position, and the mark 22 can be scanned even after the tab 14 has been actuated and the container 2 has been opened.

A maximum dimension of the mark 22, in this instance as measured between opposing corners, is approximately 4.8 mm. In some embodiments, the maximum dimension of the mark 22 is between approximately 3 mm and 5.5 mm. In other embodiments described herein, the tab 14 may optionally comprise an aperture or opening instead of the planar portion 34. Moreover, it will be appreciated that tab 14 may be any other type of pull tab or lifting feature used to create an opening in an end closure 12 or other part of the container 2.

Figure 3B:
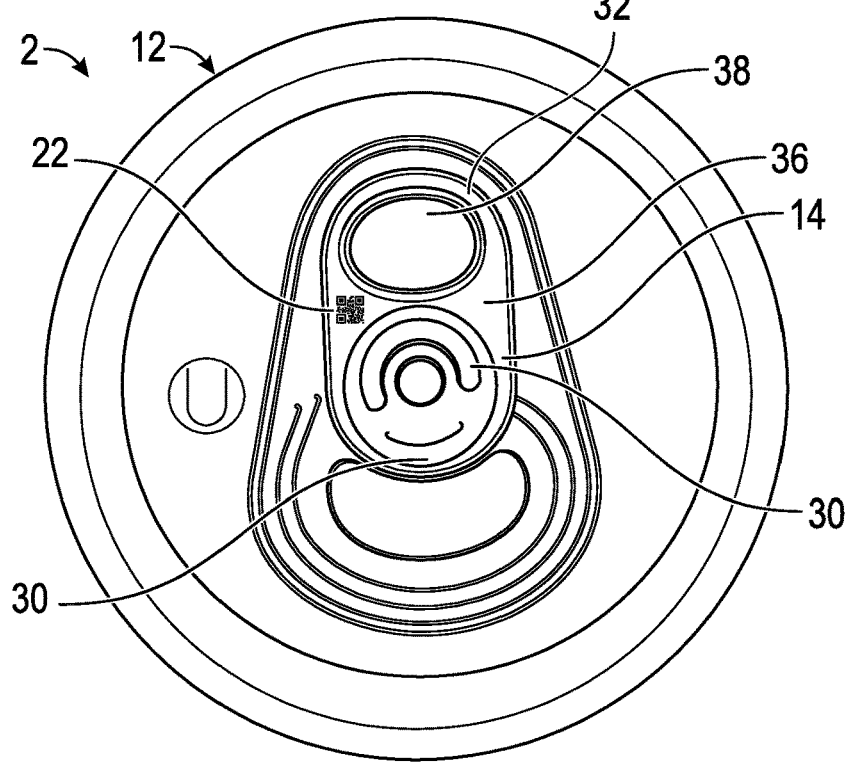
FIG. 3B is a top plan view of a container with another mark according to an embodiment of the present disclosure.

FIG. 3B is a top plan view of a mark 22 on another portion of the tab 14. In this embodiment, the mark 22 is positioned on a body 36 of the tab 14 between the rotational guide 30 and an opening 38 of the tab 14. In some embodiments, it may be desirable to have an opening 38 instead of a planar portion to provide a more user-friendly engagement of the tail 32. It will be appreciated that the mark 22 can be positioned on any part of the tab 14 that may be desirable for the scanning functions described herein. The mark 22 in FIG. 3B can have a maximum dimension, in this instance, as measured between opposing corners, of less than 4.8 mm.

Figure 3C:
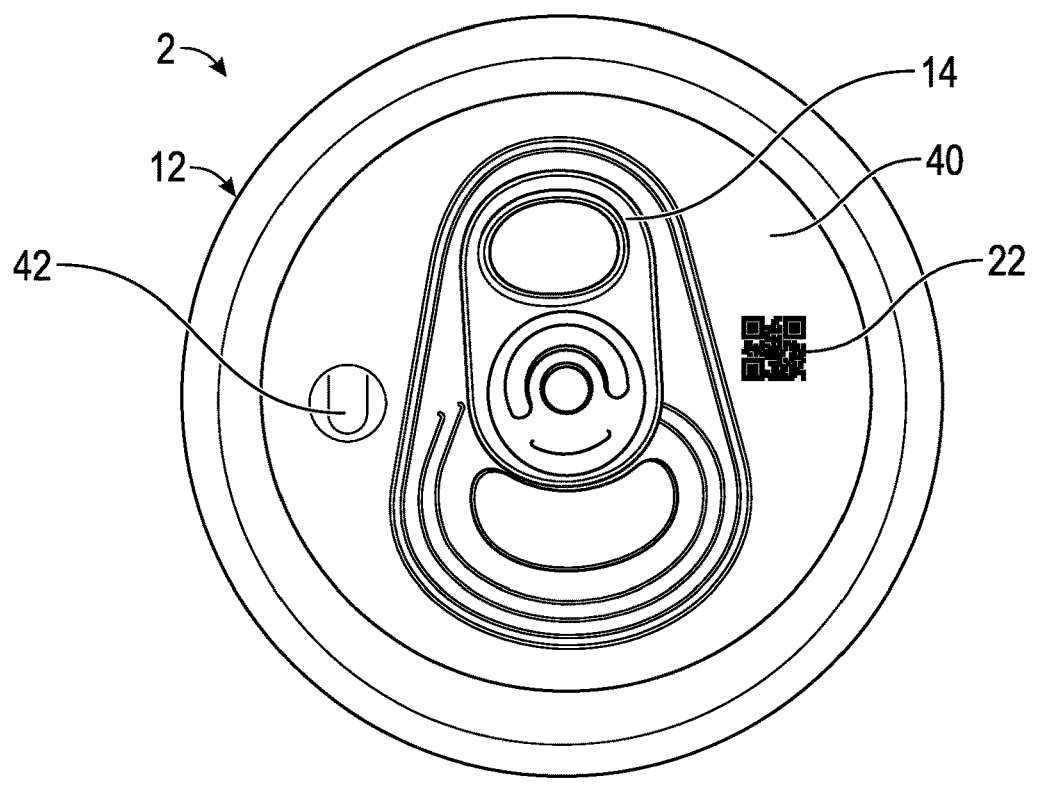
FIG. 3C is a top plan view of a container with a mark on a central portion of an end closure according to an embodiment of the present disclosure.

FIG. 3C is a top plan view of a mark 22 positioned on a central panel 40 of an end closure 12 of a container 2. As described herein, an end closure 12 can be fixed to a container 2 via, for example, a double seam to seal contents within the container 2. Then, a user can actuate the tab 14 to create an opening in the end closure 12 and to provide access to the contents within the container 2. The top surface of the end closure 12 can include a substantially planar, central panel 40 on which the mark 22 is applied. The central panel 40 can be a non-debossed portion of the end closure 12. A mark 22 in this location is advantageous because the central panel 40 is located below the tab 14 and below an outer rim formed by a double seamed joint between the container body and the end closure. Therefore, a mark 22 in this location is less likely to be damaged if the container is crushed or if the container experiences other types of damage during its lifecycle.

A maximum dimension of the mark 22, in this instance as measured between opposing corners, is approximately 7.0 mm. In some embodiments, the maximum dimension of the mark 22 is between approximately 6.0 mm and 8.0 mm. Moreover, the mark 22 can be positioned on the end closure 12 such that the mark 22 and a secondary vent feature 42 are on opposing sides of the tab to avoid the functions of the mark 22 and the secondary vent feature 42 from interfering with each other.

Figure 3D:
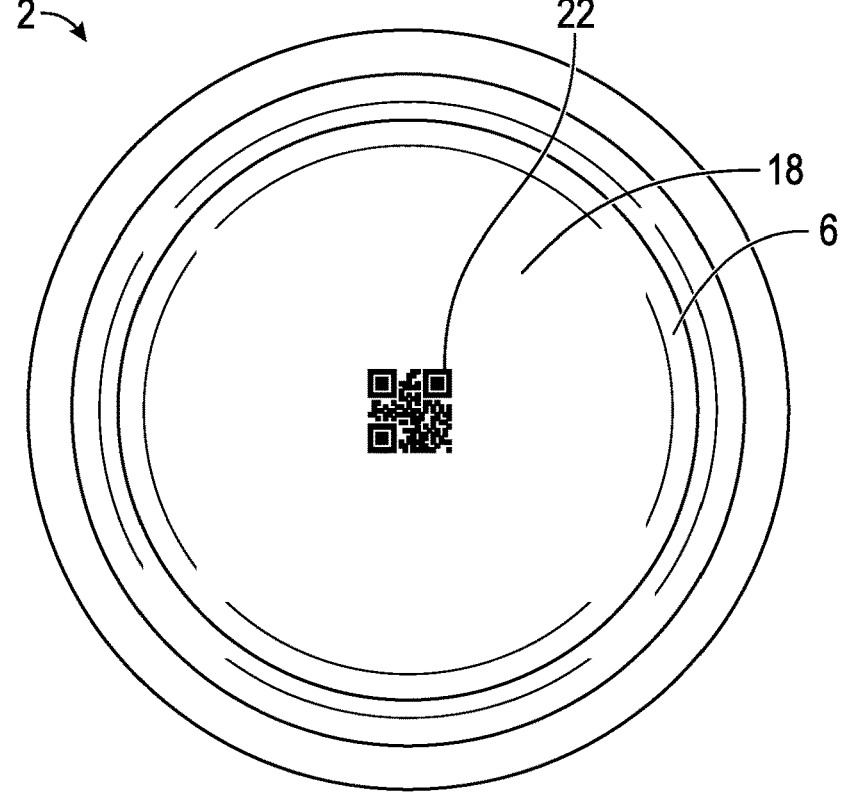
FIG. 3D is a bottom plan view of a container with a mark according to an embodiment of the present disclosure.

FIG. 3D is a bottom plan view showing a mark 22 positioned on a dome 18 of a closed end 6 of a container 2. In some embodiments, the closed end 6 is generally planar. Alternatively, as generally illustrated in FIG. 3D, the closed end 6 may include a dome 18 extending inwardly into an interior of the container body.

The mark 22 is positioned at a center point of the dome 18 and has a size that is comparatively small relative to the area of the dome 18. Thus, the mark 22 is largely undistorted, and a sensor viewing the dome 18 along a longitudinal axis of the container 2 can easily read the mark 22. A maximum dimension of the mark 22, in this instance as measured between opposing corners, is approximately 10.0 mm. In some embodiments, the maximum dimension of the mark 22 is between approximately 5.0 mm and 10.0 mm. The marks 22 shown in FIGS. 3A-3D can encompass any number of sizes. For instance, a square shaped QR code may have dimensions of 3 mm×3 mm to 20 mm×20 mm. Moreover, the marks 22 may include recurring patterns to provide redundancy within the marks 22.

As described in further detail below, in some embodiments, when the container 2 has a closed end 6 with a dome 18, a mark 22 that is larger relative to the rest of the dome 18 may be applied in an exaggerated manner to account for portions of the mark 22 on the sides of the dome and to allow a sensor viewing the dome 18 along a longitudinal axis of the container 2 to properly read the mark 22. Furthermore, the mark 22 can be exaggerated or pre-distorted to account for the mark 22 that is positioned away from the center point of the dome 18.

It will be appreciated that the term "dome" is not limited to a spherical shape or part of a spherical shape. In some embodiment, the center of the dome 18 can be planar or have a different radius of curvature compared to other portions of the dome 18 such that a mark 22 positioned on the center is less distorted when read by a sensor. In addition, the closed end may not include a dome 18, and thus, the mark 22 is not exaggerated or exaggerated in other manners to accommodate closed ends with non-domed shapes.

The marks 22 shown in FIGS. 3A-3D each have a uniform color that stands in contrast to the materials on which the marks 22 are applied. As described in greater detail below, the marks 22 can be a variety of different patterns, and the marks 22 in FIGS. 3A-3D are two dimensional marks like a quick read ("QR") code but may be other types of marks such as a one dimensional mark. In some embodiments, the marks 22 themselves may comprise more than one color to convey more information related to the container 2.

As noted above, marks 22 described herein and shown in the figures can have a variety of different patterns that convey information related to their respective containers 2. For instance, the mark 22 can be a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code). In various embodiments, the mark 22 is unique to the container such that the container can be associated with a particular consumer and/or mobile device for purposes of a deposit return program where containers are returned at designated locations for recycling. In other embodiments, the mark 22 may identify the container as part of a batch of containers, a production lot, a production shift, part of a case of containers, etc.

In some embodiments, the mark is imperceptible to the human eye. This imperceptibility can be due to the incorporation of the mark into a container decoration or artwork like those used by Digimarc. The mark can also be imperceptible due to the visibility of the ink itself. In some embodiments, the mark is formed of an ink that remains invisible or nearly invisible under most conditions but is chromatically revealed by, for instance, an ultraviolet light.

In various embodiments, the shape of the mark is changed to accommodate the shape of, for example, a dome on which the mark is applied. When a two dimensional mark is applied to a three dimensional surface, the mark can be distorted such that a sensor cannot discern or properly read the mark. Specifically with a dome, if a two dimensional mark is applied to the center of a dome, then the center of the mark will likely remain undistorted and readable. However, the edges of the mark are positioned on the edges of the dome, and a sensor viewing the dome along the longitudinal axis of the dome and the container may not discern or read the edges of the mark that are nearly parallel or at a non-perpendicular angle to the longitudinal axis. To account for this distortion, the two dimensional mark may be applied in a manner that accounts for distortion and provides a more readable mark for a sensor.

In one embodiment, one portion of a mark, such as the center, remains unchanged or nearly unchanged. Then, another portion of the mark, such as the edges around the center, are stretched to a larger, more exaggerated size. Therefore, when the mark is applied to a dome or other curved surface, the stretched and exaggerated outer edges of the mark will be positioned on the edges of the dome. As a result, when a sensor is oriented along a longitudinal axis of the dome and container, the center of the mark along with the outer edges of the mark will appear more normal and undistorted and thus more readable to the sensor.

Application of the mark can also account for other aspects of the manufacturing process. For instance, if the mark is applied early in the manufacturing process, then the mark can be changed to account for a subsequent process. When the mark is applied to a flat sheet of metal before the initial cupping action to begin shaping the metal into a container, the mark can be applied in a smaller shape in anticipation of the metal material being stretched, a dome being formed into the portion of the metal with the mark, etc. Thus, in one embodiment, a mark can be applied to a metal sheet with a total size that is smaller relative to the expected final size of the mark on the dome of a container. This can be combined with the above aspect of printing a two dimensional shape onto a three dimensional, curved surface. Therefore, the mark can be applied to a sheet of metal with a smaller overall size, but the outer edges of the mark have a larger size relative to the center of the mark to account for the shape of the dome of the container.

Figure 4A:
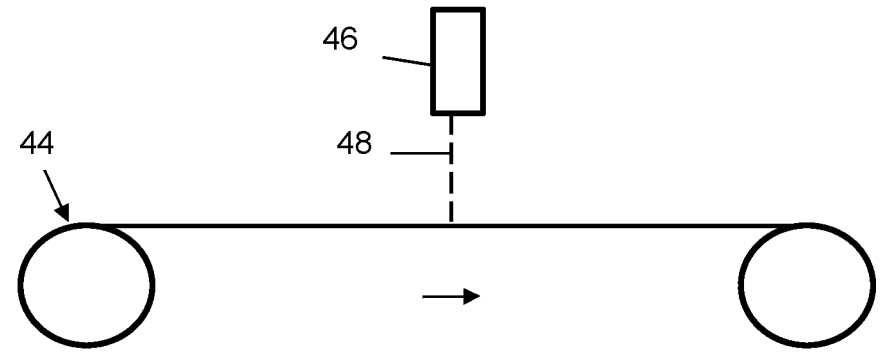
FIG. 4A is an elevation view of a light source applying a mark to tab stock according to an embodiment of the present disclosure.

Referring now to FIGS. 4A-4D, views of various exemplary processes for applying marks to tab stock 44 are provided. FIG. 4A shows a manufacturing line where tab stock 44 moves in the direction shown by the arrow. A light source 46 such as a laser is positioned on the manufacturing line such that one side of the tab stock 44 is oriented toward the light source 46. The light source 46 can emit a light 48 to etch a mark into the tab stock 44 in a relatively clean process without dust or debris and at a high rate of speed to match the speed of production. Specifically, the laser can etch a mark into the tab stock 44 where an outer layer or outer film of material is vaporized to produce the mark. However, in some embodiments, the laser preserves a lacquer layer on the container, or the laser applies the mark before the lacquer layer is applied to protect the container against corrosion. Additionally, or alternatively, the laser alters a color of the metal tab stock 44. In some embodiments, the laser alters one or more of a color, a hue, or an emissivity of a coating (for example, an ink, a lacquer, a varnish, and/or a pigment) on the metal tab stock. In various embodiments, the laser can partially melt the material of the tab stock. Thus, the laser produces a durable mark with a color that is distinguished from the rest of the tab stock.

Figure 4B:
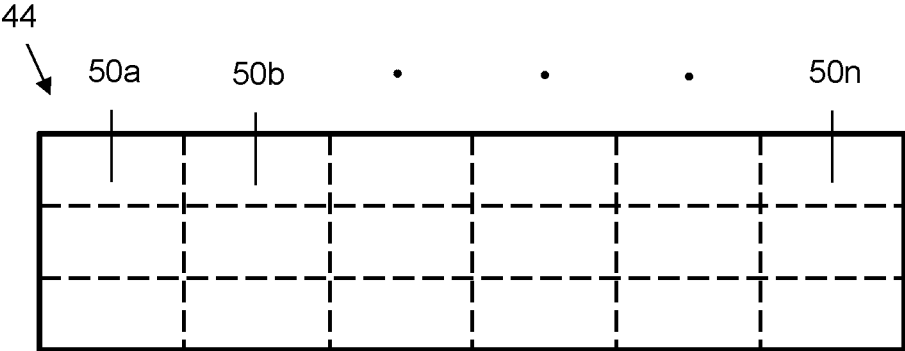
FIG. 4B is a top plan view of the tab stock in FIG. 4A according to an embodiment of the present disclosure.

FIG. 4B is a top plan view of the tab stock 44 in FIG. 4A. The tab stock 44 in this embodiment is divided into portions 50a,b,n where the light source 46 etches a mark into each portion 50a,b,n. Then, each portion 50a,b,n is subsequently formed into a tab that is connected to an end closure of a container. As each tab bears a unique mark, the tab, and therefore, the container, can be tracked and traced as described herein. The light source 46 can etch the mark into different locations of each portion 50a,b,n to place the mark on different areas of the resulting tab, as described herein.

Figures 4C, 4D:
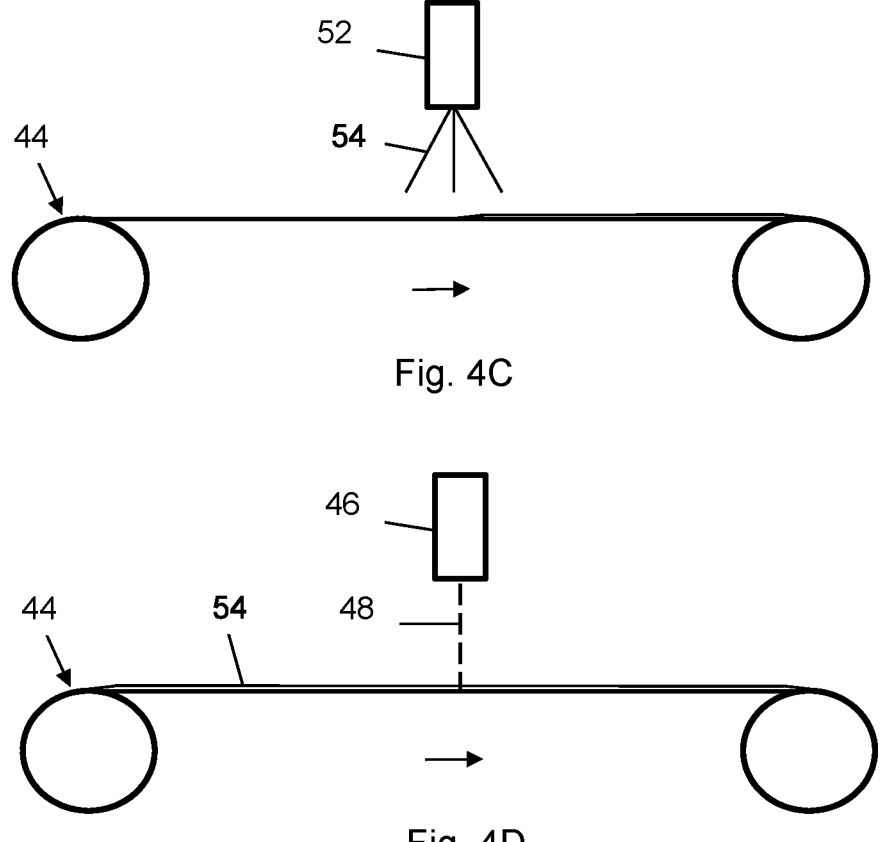
FIG. 4C is an elevation view of an applicator applying a lacquer to tab stock according to an embodiment of the present disclosure.
FIG. 4D is an elevation view of a light source applying a mark to the tab stock in FIG. 4C according to an embodiment of the present disclosure.

Referring now to FIGS. 4C and 4D, another process for applying a mark to a tab stock 44 is provided. In these figures, the tab stock 44 moves beneath an applicator 52 that coats at least part of the tab stock 44 with a lacquer 54 that can include a pigment. Then, as shown in FIG. 4D, parts of the lacquer 54 and/or pigment can be activated with the light 48 from a light source 46 to produce a mark. Light 48 in this sense can mean any electromagnetic radiation. In some embodiments, the light source 46 is a laser. In some embodiments, the laser 52 etches a mark, and then the lacquer 54 is applied to preserve the mark.

In some embodiments, the pigment is a powder that changes color when at least some of the powder is carbonized or foamed by the laser. In other embodiments, the pigment is a material having granules that change to a darker color in response to a laser. In some embodiments, the pigment comprises between approximately 46-62% Mica and between approximately 38-54% $(Sn/Sb)O_2$. In various embodiments, the pigment is titanium dioxide coated with organosilane. The pigment can be optionally combined with a substrate for easier application and binding to the container. In some embodiments, the substrate is a fluoropolymer material, a polytetrafluoroethylene material, a perfluoroalkoxy material, a fluorinated ethylene propylene material, and/or an ethylene tetrafluoroethylene material.

In various embodiments, the laser 46 is a 10.6 or 9.3 μm $CO_2$ laser or a neodymium-doped yttrium aluminum garnet $(Nd:Y_3Al_{15}O_{12})$ laser. In further embodiments, the laser is a fiber laser where the active gain medium is an optical fiber doped with rare-earth elements such as erbium, ytterbium, neodymium, dysprosium, praseodymium, thulium and/or holmium. An advantage of fiber lasers over other types of lasers is that the laser light 48 is both generated and delivered by an inherently flexible medium, which allows easier delivery to the focusing location and target. This can be important for etching a mark onto a tab stock or even a curved surface such as the dome of a container.

Moreover, the application of the lacquer 54 and the activation of the lacquer 54 and/or pigment can occur in a single location or multiple locations. For instance, the tab stock 44 or even a portion of a container body (such as a closed end of a container) can be coated with a lacquer 54 at a first location where the container body is manufactured. Then, the container bodies and end closures are received at a second location where a container body is filled and an end closure is sealed onto the body to produce a finished container. At this second location, or even at a third location, a light source 46 can be used to selectively activate part of the lacquer 54 and/or pigment coating to produce a mark 22.

Figure 5A:
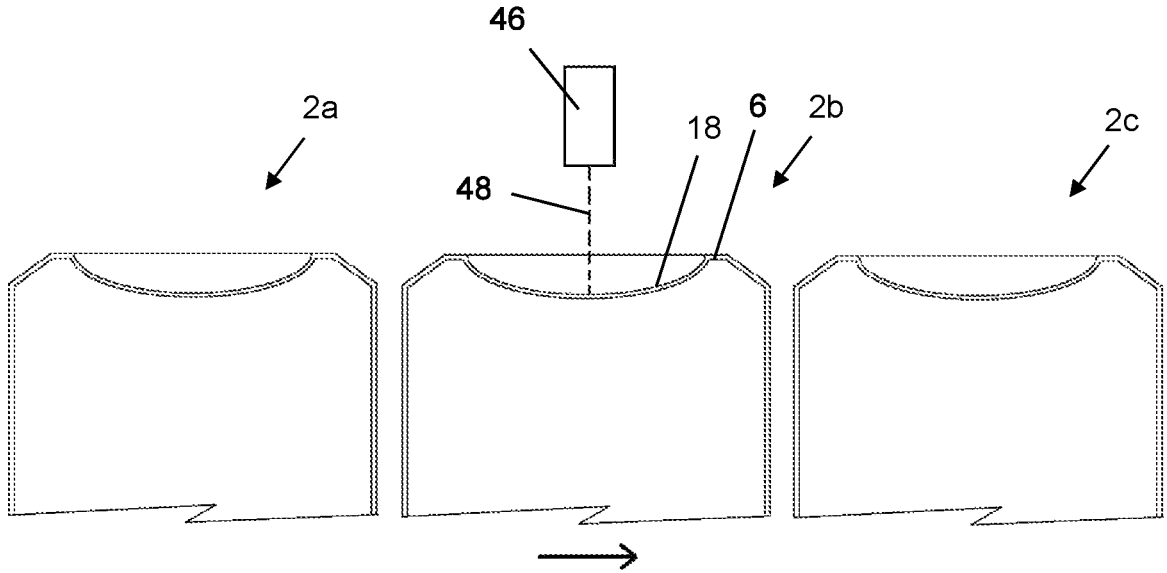
FIG. 5A is an elevation view of a light source applying a mark to a container according to an embodiment of the present disclosure.

Referring now to FIGS. 5A-5E, views of various exemplary processes for applying a mark to containers 2a-2c are provided. FIG. 5A shows a manufacturing line where containers 2a-2c move in the direction shown by the arrow. A light source 46 such as a laser is positioned on the manufacturing line such that the domes 18 of the closed ends 6 of the containers 2a-2c are oriented toward the light source 46. In some embodiments, the closed ends 6 do not comprise domes.

Like the light source 46 in FIG. 4A, the light source 46 in FIG. 5A can emit a light 48 to etch a mark into the dome 18 in a relatively clean process without dust or debris and at a high rate of speed to match the speed of production. Specifically, the laser can etch a mark into the dome 18 where an outer layer or outer film of material is vaporized to produce the mark. However, in some embodiments, the laser preserves a lacquer layer or varnish layer on the container, or the laser applies the mark before the lacquer layer or varnish layer is applied to protect the container against corrosion. In various embodiments, the laser can partially melt the material of the dome 18. Thus, the laser produces a durable mark with a color that is distinguished from the rest of the dome 18.

Figure 5B:
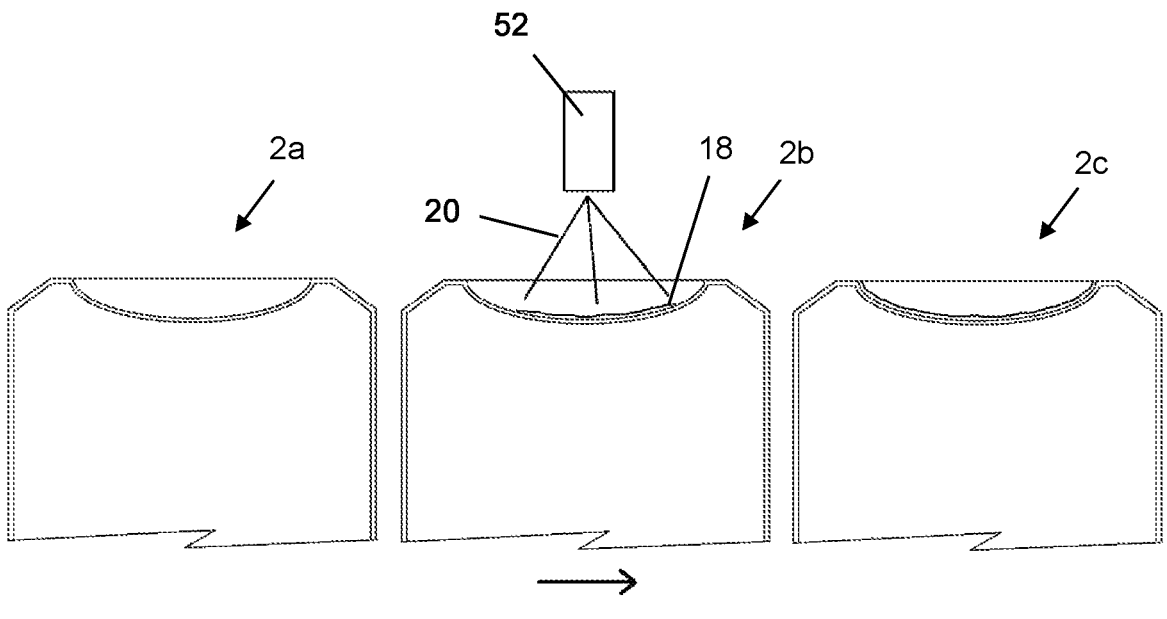
FIG. 5B is an elevation view of an applicator applying a varnish to a container according to an embodiment of the present disclosure.
Figure 5C:
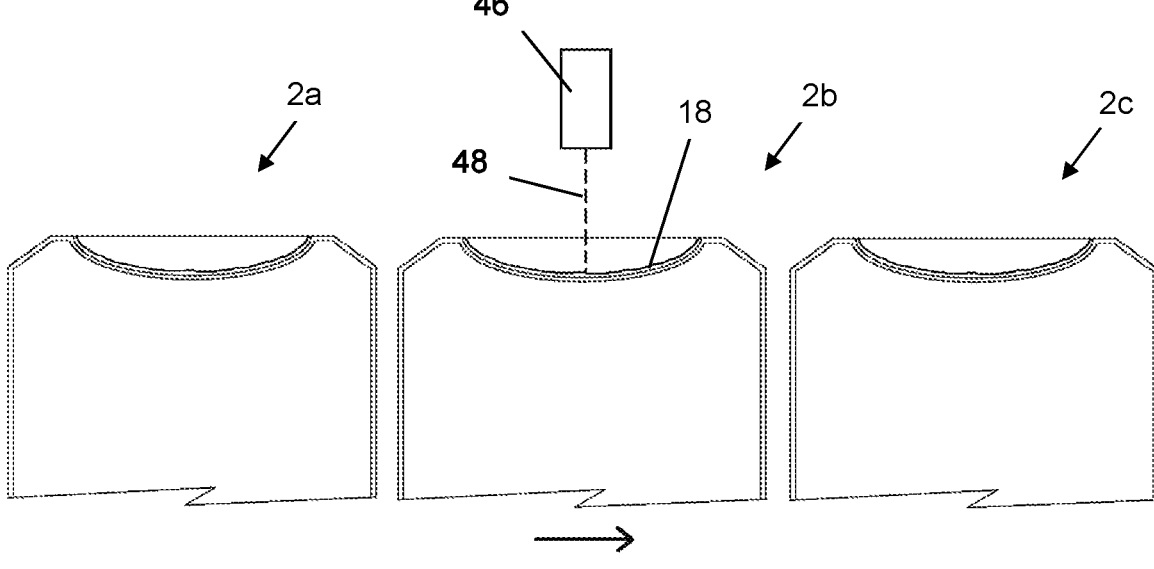
FIG. 5C is an elevation view of a light source applying a mark to the container in FIG. 5B according to an embodiment of the present disclosure.

Referring now to FIGS. 5B and 5C, another process for applying a mark onto a container is provided. In FIG. 5B, the containers 2a-2c move along a manufacturing line with the domes 18 oriented toward an applicator 52 or varnish unit. As each container 2a-2c moves along the manufacturing line, the applicator 52 coats at least a portion of the dome 18 with a varnish 20 that can have a pigment. Then, parts of the varnish 20 and/or pigment can be activated or altered by the light 48 of a light source 46 to produce a mark. Light 48 in this sense can mean any electromagnetic radiation.

Figure 5E:
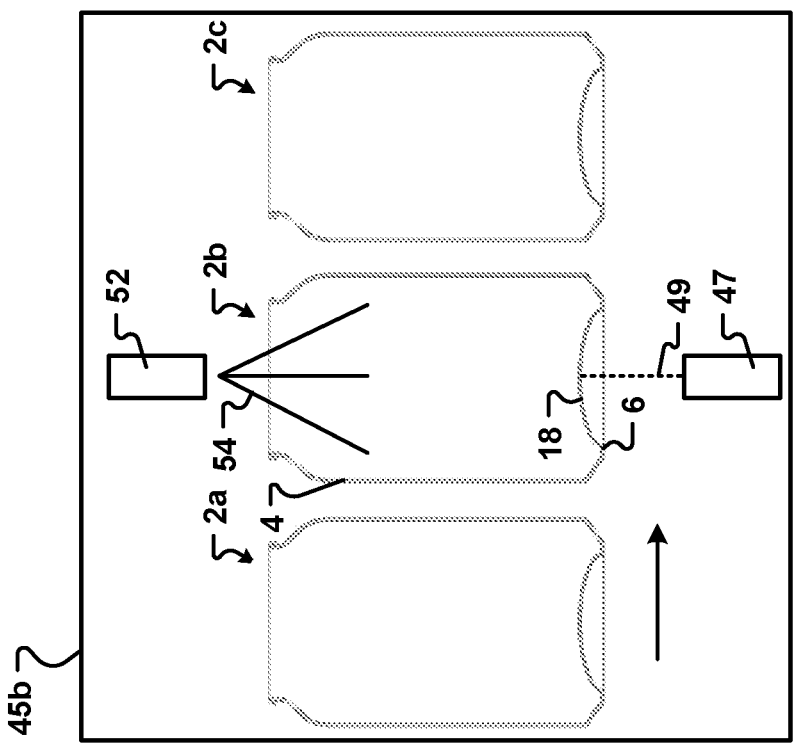
FIG. 5E is an elevation view of an inkjet print head applying a mark to a container according to an embodiment of the present disclosure.
Figure 5D:
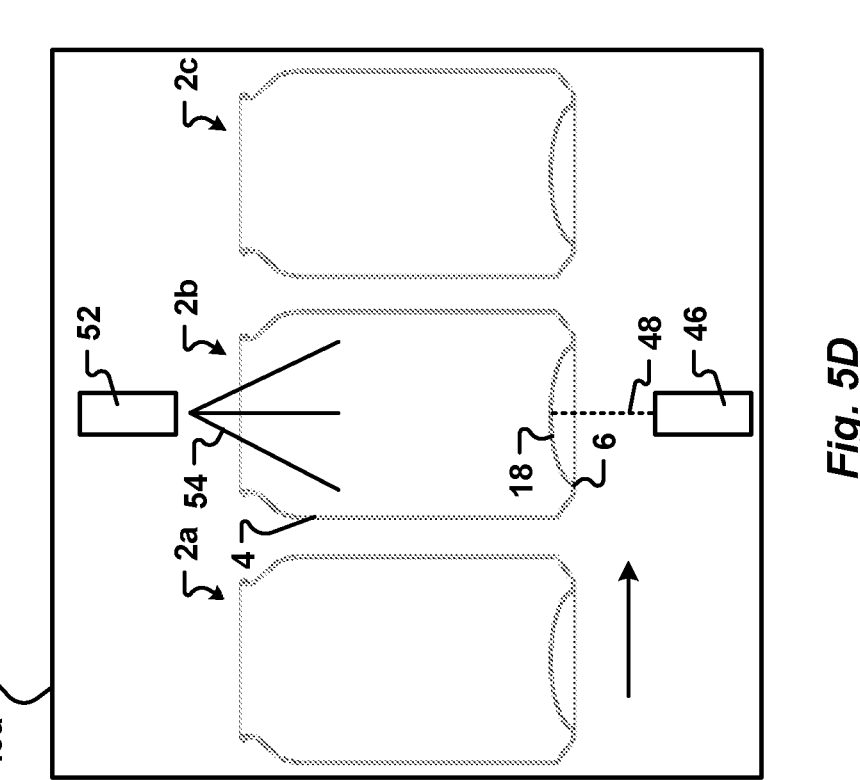
FIG. 5D is an elevation view of a light source applying a mark to a container according to an embodiment of the present disclosure.

FIG. 5D shows a manufacturing line within a container production facility where containers 2a-2c move in the direction shown by the arrow. The containers 2a-2c are illustrated at an interior coat spray unit 45a which includes an applicator 52 to spray a coating 54 onto an interior surface of the container bodies 4. The coating 54 may be a lacquer or other coating known to those of skill in the art.

The interior coat spray unit 45a includes a light source 46. The light source is oriented to emit light 48 to form a mark 22 on the closed ends 6 of the containers 2a-2c as they are processed by the interior coat spray unit. Optionally, the light source 46 forms the mark while the applicator 52 sprays the coating 54 onto the interior surface of a container boy 4.

The light source 46 may be a laser as described herein or any other suitable laser known to those of skill in the art. Like the light source 46 in FIG. 4A, the light source 46 in FIG. 5A can emit a light 48 to etch a mark into the closed end 6 in a relatively clean process without dust or debris and at a high rate of speed to match the speed of production. Specifically, the laser can etch or engrave a mark into the closed end where an outer layer or outer film of material is vaporized to produce the mark. In some embodiments, the closed ends 6 comprise domes 18 and the light source forms the mark on the domes.

Alternatively, in some embodiments, the laser 46 preserves a lacquer layer on the container, or the laser applies the mark before the lacquer layer is applied to protect the container against corrosion. In various embodiments, the laser can partially melt or ablate the material of the closed end 6. Thus, the laser produces a durable mark with a color that is distinguished from the rest of the closed end.

FIG. 5E shows another embodiment of a manufacturing line within a container production facility where containers 2a-2c move in the direction shown by the arrow. The containers 2a-2c are illustrated at an interior coat spray unit 45b which includes an applicator 52 to spray a coating 54 onto an interior surface of the container bodies 4 similar to the applicator of the interior coat spray unity 45a described in conjunction with FIG. 5D.

Interior coat spray unit 45b includes an inkjet print head 47. The inkjet print head is oriented to jet ink 49 to form a mark 22 on the closed ends 6 of the containers 2a-2c as they are processed by the interior coat spray unit. Optionally, the inkjet print head 47 forms the mark while the applicator 52 sprays the coating 54 onto the interior surface of a container boy 4.

Any suitable inkjet print head know to those of skill in the art may be used with the interior coat spray unit 45b. The ink 49 may be of any suitable type known to those of skill in the art. In some embodiments, the ink 49 is a solvent, a water based or a UV cure ink. Moreover, the ink 49 can be applied by spraying, inkjet, soft pad, etc.

Figure 6A:
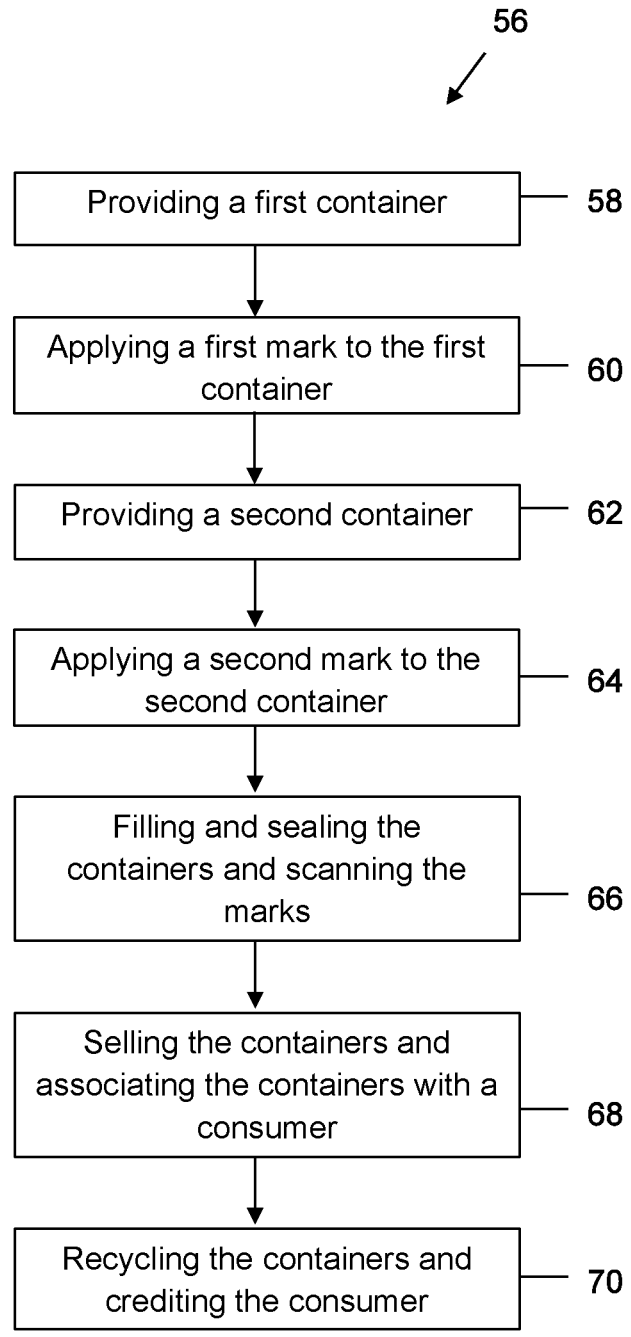
FIG. 6A is a schematic for a process of applying a mark on a container according to an embodiment of the present disclosure.
Figure 6B:
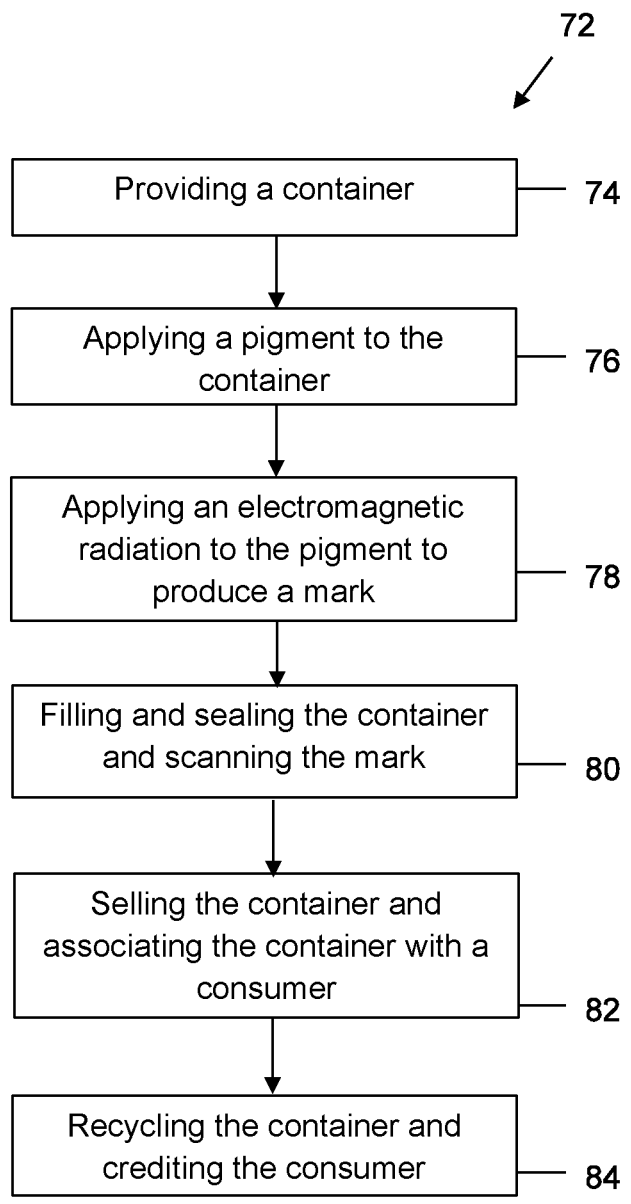
FIG. 6B is a schematic for another process of applying a mark on a container according to an embodiment of the present disclosure.

Referring now to FIGS. 6A and 6B, processes 56, 72 for applying a mark to a container are provided. In some embodiments, a unique mark is provided on each container so that each container can be associated with specific scanning events, locations, devices, etc. throughout the lifecycle of the container. As such, in FIG. 6A, one process 56 comprises providing 58 a first container and applying 60 a first mark to the first container. Then, the process 56 comprises providing 62 a second container and applying 64 a second mark to the second container where the first and second marks are distinct. Thus, each mark is unique to each container. Moreover, it will be appreciated that while FIG.

6A describes a process of applying a mark to a container, the mark can be applied to a continuous sheet of material that is subsequently formed into a container, applied to a dome of a container, applied to a tab of a container, etc., as described herein. Moreover, the mark can be applied by laser etching, inkjet printing, pigment and laser activation, etc. as discussed herein.

This method can also apply to a manufacturing line that applies different marks to different groups of containers. For example, in some embodiments, a first mark may be applied for an entire batch, production lot, or run of a predetermined number of containers. Then, a second mark is applied for the next batch, production lot, or run. Subsequently, the containers can be filled 66 with contents and sealed at, for instance, a filler. Then, the containers are sold 68 to a consumer where the containers and related marks are associated with the consumer as described elsewhere herein. Finally, consumers can recycle 70 the containers at a recycling center or collection point, and the consumers are credited with this recycling event as described elsewhere herein.

FIG. 6B shows the process 72 for activating a varnish and/or pigment where a container is provided 74, the varnish is applied 76 where the varnish can have a pigment, and then at least part of the varnish and/or pigment is activated 78 with electromagnetic radiation. The device that applies the varnish can apply the varnish in the same manner for every container. Then, the device that activates the varnish and/or pigment can produce a distinct mark for each container.

One or more of the actions described in these processes 56, 72 can occur at the decoration station of a manufacturing line or, as described above, at different locations or points in the manufacturing line such as after a dome reforming station or before the decorating station. In some embodiments, the processes 56, 72 may occur before a container body is formed, or before a tab is formed from tab stock. Then, the containers can be filled 66, 80 with contents and sealed at, for instance, a filler. Next, the containers are sold 68, 82 to a consumer where the containers and related marks are associated with the consumer as described elsewhere herein. Finally, the consumer can recycle 70, 84 the containers, and the consumer is credited with this recycling event as described elsewhere herein. In the processes 56, 72 shown in FIGS. 6A and 6B, the mark can be applied to any portion of a container. In some embodiments, the mark is applied to a dome portion of a container. In other embodiments, the mark is applied to a bottom surface of a container such as a tapered cup, a sidewall of a container, a tab on an end closure of a container, etc.

In one embodiment, the containers are sent to a filler, which is downstream of a manufacturing or production facility. The containers and/or end closures are shipped to a filler where contents are placed in the containers and the containers are sealed and dried off. Then, the containers move through a single stream pass where a mark is applied to each container with, for instance, a laser. Furthermore, in embodiments of the present disclosure where a cap (such as a roll-on pilfer proof closure) is threaded or formed onto an opening of a container, the mark can be applied on the cap at the filler, by a third party supplier that manufacturers the caps, or even by, for instance, the container manufacturer or other party at a subsequent location. The mark can be applied on any location or surface on the cap.

It will be appreciated that the present disclosure encompasses other embodiments of applying a mark to a container such as printing and embossing or debossing. With printing, ink or another material is selectively applied to the container where the ink has a distinct color from the surrounding portion of the container, and a sensor detects and reads this distinction. Thus, for some embodiments, an ink covers part of an aluminum container, and a laser evaporates a finish on the container or melts part of the container to change the emissivity of part of the container to form a mark 22. A sensor such as an infrared sensor can detect the contrast in emissivity to then read the particular mark applied to the container. Since aluminum and other metals have a low emissivity, the ink or change to the aluminum or metal may be characterized as having a higher emissivity such that a sensor can detect the contrast in emissivity. Similarly, debossing or embossing alters the shape of part of the container, and thus, a sensor (such as a camera or other visual sensor) detects a difference in shape or reflected light to determine the shape of the mark on the container.

Further still, while a physical mark is discussed herein, the present disclosure encompasses other ways of identifying, tracking, and tracing a container. For instance, a radio-frequency identification (RFID) tag can be attached to various parts of the container like the dome, the tab, and the cap. Thus, the RFID tag can be incorporated into a tab before the tab is attached to a rivet on an end closure, and the manufacturing process is not slowed or disturbed. Similarly, the RFID tag can be positioned on the dome of a container after the dome is formed with, for instance, an adhesive. When the RFID tag is triggered by an electromagnetic interrogation pulse from a nearby RFID reader device, the tag transmits digital data back to the reader. This data can include information such as a unique identifier, batch information, or other information described herein. One benefit of an RFID tag is that the sensor, or RFID reader device, only needs to be proximate to the RFID tag rather than aligned in a particular orientation relative to a mark on the container. For low frequency bands of 120-150 kHz, the RFID tag and reader device can be approximately 10 cm or closer to exchange or transmit information. For higher frequencies such as 13.56 MHz, the RFID tag and reader device can be approximately 10 cm to 1 m or closer to exchange or transmit information.

In some embodiments, a ferromagnetic ink can be printed on part of the container where the ferromagnetic ink functions similarly to a RFID tag and reader device. The ferromagnetic ink can be triggered by an electromagnetic interrogation pulse from a nearby reader device to cause the ferromagnetic ink to transmit information to the reader device.

Figure 7:
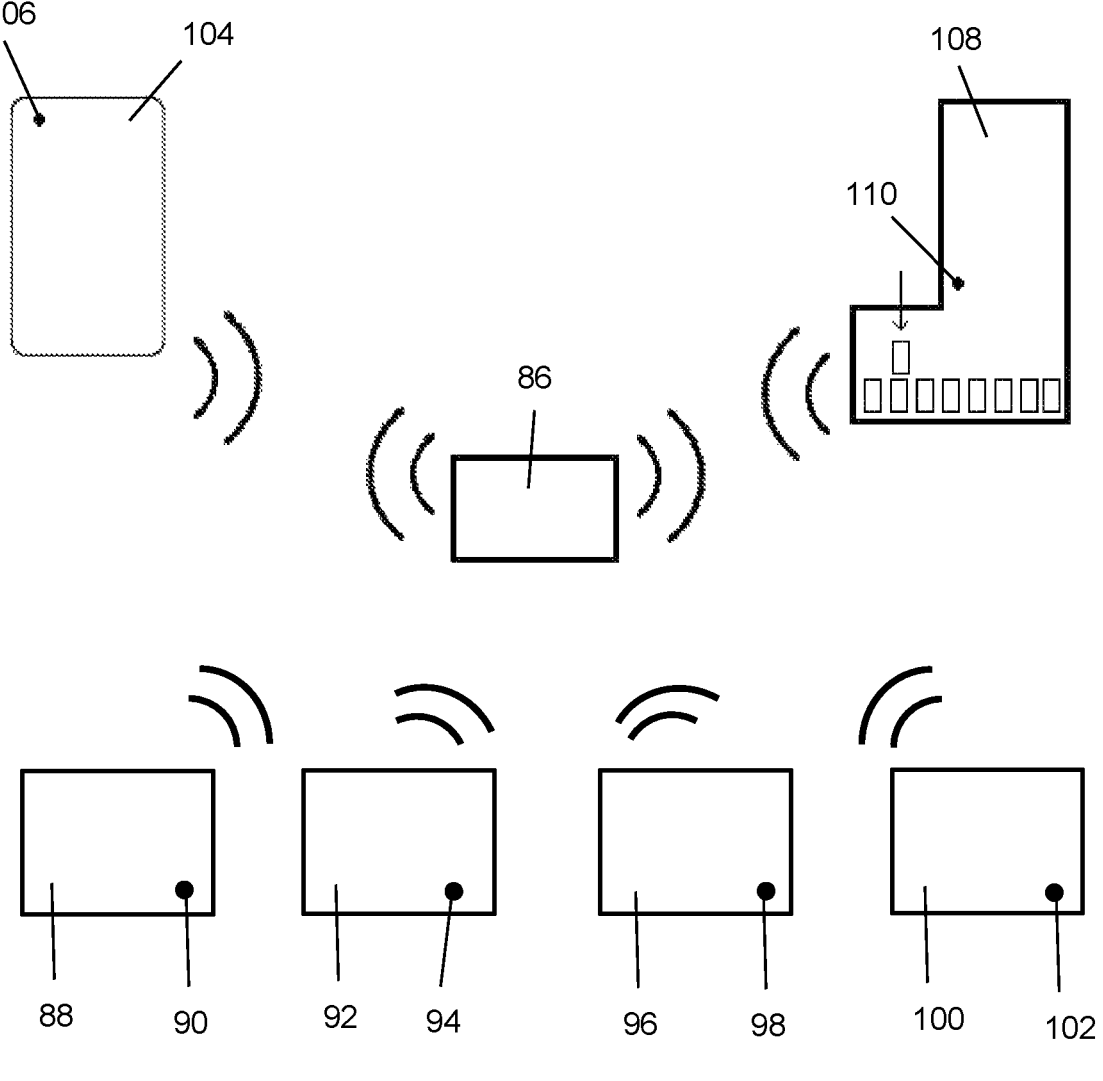
FIG. 7 is a schematic of a system for tracking a container according to an embodiment of the present disclosure.

Referring now to FIG. 7, a system for tracking and tracing a container throughout the lifecycle of the container is provided where the system in this embodiment includes a database 86, a production facility 88, a filler facility 92, a distribution facility 96, a seller facility 100, a mobile device 104, and a collection device 108 for receiving containers for recycling. Tracking and tracing a container is important for a number of reasons as described herein, including monitoring the production, distribution, and sale of containers. Each facility 88, 92, 96, 100 in FIG. 7 has a respective sensor 90, 94, 98, 102 to scan a unique mark on a container and transmit a scan even to the database 86, where data is collected, processed, and signals may be transmitted from the database 86 to, for example, the mobile device 104. Moreover, each facility may have multiple sensors for scanning the unique mark on a container at multiple locations within a facility. For example, within the production facility 88, the unique mark may be scanned at a continuous sheet that is formed into a container and again upon exit from a manufacturing or production line and again at an area where containers are collected on pallets. Similarly, a unique mark on a container can be scanned upon entry to a filler 92 and again after a container is filled and sealed with a beverage or other contents.

After the container with the unique mark is sold to a consumer, the tracking and tracing of the container through its lifecycle can continue to improve the performance of deposit return public policies and environmental programs, which can be accomplished in a number of ways. For instance, a consumer can be incentivized to return a container to a collection device 108 by receiving a credit to the mobile device 104 like a monetary credit, a credit or message on a social network or application on the mobile device 104, etc.

The mobile device 104 has a sensor 106 such as a camera for reading a mark on a container, and the mobile device 104 is in electronic communication with a database 86 via a network such as the Internet. The collection device 108 also has a sensor 110 such as a camera for reading a mark on a container. In other embodiments, another sensor is used to read marks that are imperceptible within the visible spectrum of electromagnetic radiation. The collection device 108 is also in electronic communication with the database 86 via a network such as the Internet.

The database 86 can receive information regarding scanning events, which device conducted the scan at what time, information about the container itself, etc. The database 86 can also distribute data as necessary to fulfill functions of the system such as signaling to the mobile device 104 that a particular container has been received by the collection device 108. In addition, data from the database 86 can be harvested to determine broader trends such as the recycle rate for a particular production batch or shift, the recycle rate for various types and sizes of containers, the recycle rate for particular products or brands, the recycle rates in various locations or by demographic groups, the recycle rate for containers sold at a particular location or a particular time, etc. The database and/or the application on the mobile device can push notifications or messages to the consumer regarding recalls for the container or contents within the container or an expiration date for the contents within the container. In addition, the mark can serve a safety function for a consumer where the consumer can scan the mark and determine that the container is not counterfeit and that the container is genuine. The information gleaned from the tracking and tracing system can be used to monitor leakage and distribution, collect information regarding sales or resale, collect information regarding the location of a container, and track a container for taxation purposes.

It will be appreciated that the system can include many combinations of devices. For instance, every source of information such as manufacturers, fillers, retailers, consumers, recyclers, etc. can have a device with a sensor that reads a mark on a container and transmits information to the database. Moreover, different entities can administer the system. For example, in some embodiments, a brand owner administers the system and directs the collection and transmission of information. In these embodiments, the brand owner purchases containers that may already be filled and seamed, or the brand owner can fill and seam the containers itself. The brand owner can then receive information associating a mark with a container or containers from the seller, or the brand owner can log this information itself with a device having an appropriate sensor. Then, the brand owner can distribute or sell the containers to consumers. The sale can be coordinated with an application that a consumer can download onto a mobile device. The consumer can use the camera or other sensor of the mobile device to read the mark on a container to associate the mark and the container with the consumer and/or the mobile device. From this point, the brand owner can engage the consumer to incentivize the consumer to recycle the container with promotion, monetary credit, credit for further purchases of the brand owner's products, etc. The brand owner can optionally maintain and receive information from collection devices and recyclers.

In other embodiments, the system does not necessarily require a mobile device or other electronic device owned by the consumer. In these embodiments, the consumer purchases the container or pack of containers at a retailer, and the consumer can scan a card associated with the retailer. This card can be part of a loyalty program with the retailer. Thus, when the card is scanned at checkout, a database 90 receives information regarding the card and the mark on the container and associates the container with the card and consumer. Then, the consumer can recycle the container at a collection device 92 that scans the mark on the container and transmits this information to the database. In response to the recycling event, the system that comprises the database can, for example, cause a credit to be deposited to an account associated with the card owned by the consumer.

Referring now to FIG. 8, a process 112 for utilizing part of the system in FIG. 7 is provided. To begin, the consumer can scan 114 a mark on a particular container with a particular mobile device. Then that scanning event is transmitted 116 from the mobile device to the database where the database associates 118 the particular container with the particular mobile device. Then, a consumer can drop the container into a collection device where the collection device scans 120 the mark on the container, and the collection device transmits 122 this scanning event to the database. The database transmits 124 a signal to the mobile device indicating that the container has been collected for recycling. This signal can cause a monetary transaction where the consumer is credited with a monetary amount for depositing the container in the collection device. Alternatively, or in addition, the signal can cause a message or post in an application on the mobile device or a social network. It will be appreciated that the database can be part of the mobile device, part of the collection device, or a separate device. Moreover, it will be appreciated that the systems and processes described in FIGS. 7 and 8 can use used for any mark and with any processes for applying a mark to a container.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as additional items. Further, it is to be understood that the claims are not necessarily limited to the specific features or steps described herein. Rather, the specific features and steps are disclosed as embodiments of implementing the claimed systems and methods.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

A "communication modality" can refer to any protocol or standard defined or specific communication session or interaction, such as Voice-Over-Internet-Protocol ("VoIP), cellular communications (e.g., IS-95, 1G, 2G, 3G, 3.5G, 4G, 4G/IMT-Advanced standards, 3GPP, WIMAX™, GSM, CDMA, CDMA2000, EDGE, 1xEVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or Microsoft Network (MSN) Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers to some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, read only memory (ROM), a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The terms display and variations thereof, as used herein, may be used interchangeably and can be any panel and/or area of an output device that can display information to an operator or use. Displays may include, but are not limited to, one or more control panel(s), instrument housing(s), indicator(s), gauge(s), meter(s), light(s), computer(s), screen(s), display(s), heads-up display HUD unit(s), and graphical user interface(s).

The term "module" as used herein refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation, or technique.

While the exemplary aspects, embodiments, options, and/or configurations illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a private branch exchange (PBX) and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infrared data communications.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very-large-scale-integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or computer-generated imagery (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

To provide additional background, context, and to further satisfy the written description requirements of 35 U.S.C. § 112, the following references are incorporated by reference herein in their entireties: British Pat. Pub. No. 2154775A, European Pat. App. No. 1467306A2, Japanese Pat. No. 3,971,064, Japanese Pat. No. 4532259, PCT Pub. No. WO2005/104005, PCT Pub. No. WO2013/135899A1, PCT Pub. No. WO2013/138595A2, PCT Pub. No. WO2014/063837A1, PCT Pub. No. WO2014/150647A1, PCT Pub. No. WO2014/152858A1, PCT Pub. No. WO2014/187474A1, PCT Pub. No. WO2016/183452A1, PCT Pub. No. WO2018/033627A1, PCT Pub. No. WO2019/049454A1, U.S. Pat. Nos. 4,879,457, 5,632,916, 6,872,913, 9,517,498, 9,663,846, 10,073,443, 10,421,111, 10,583,668, 10,726,288, U.S. Pat. Pub. No. 2020/0070494A1, U.S. Pat. Pub. No. 2021/0276069 A1.

What is claimed is:

1. A method for tracking and tracing a container, comprising:
   providing an end closure with a tab, wherein the end closure comprises a first unique mark formed on the tab;
   transmitting the first unique mark to a database via a network, the database configured to receive and store scan events, wherein the first unique mark is associated in a record of the database with production information about the tab;
   providing a container body with a second unique mark;
   transmitting the second unique mark to the database via the network, wherein the second unique mark is associated in a record of the database with production information about the container body;
   transmitting to the database via the network, by a filler sensor at a filler location, a scan event of at least one of the first unique mark and the second unique mark, wherein the end closure is joined with the container body to form the container at the filler location; and
   transmitting to the database via the network, by a sensor, a scan event of at least one of the first unique mark or the second unique mark of the container, wherein the sensor is at a location which is distinct from the filler location.

2. The method of claim 1, wherein the production information about the container body includes at least one of batch information, production lot information, and production shift information regarding the container body of the container, and wherein the production information about the tab includes information about a sheet of a tab stock that is used to form the tab.

3. The method of claim 1, further comprising forming, by a laser, the first unique mark on a sheet of a tab stock, wherein the laser physically changes parts of the sheet of the tab stock from a first emissivity to a second emissivity to form the first unique mark.

4. The method of claim 3, further comprising, after forming the first unique mark, applying a lacquer layer to the sheet of the tab stock to preserve the first unique mark.

5. The method of claim 1, further comprising forming, by a tab press, a planar portion of the tab, wherein the first unique mark is located on the planar portion.

6. The method of claim 5, wherein the planar portion is recessed below a tail and a body of the tab.

7. The method of claim 1, wherein the tab is attached to a rivet of the end closure.

8. The method of claim 1, wherein the first unique mark is located on a body of the tab, and the body is positioned between a nose and a tail of the tab.

9. The method of claim 1, wherein the tab has a first side and a second side, wherein the first side faces the end closure before the container is opened, wherein the second side faces away from the end closure before the container is opened, and wherein the first unique mark is located on the second side.

10. The method of claim 1, wherein the first unique mark and the second unique mark are each one of a QR code, a watermark, a serialized number, a two-dimensional barcode (SnapTag®), a patterned graphic code (Digimarc®), a bar code, Datamatrix, Aztec Code, Quickmark, DotCode, Shotcode, Maxicode, MicroQR, Beetagg, Nexcode, Han Xin, Trill Code, Kik Codes, or a static or dynamic circular QR code (TikTok® Code).

11. The method of claim 1, further comprising:
   marking a continuous sheet of tab stock with the first unique mark; and
   forming the tab from the continuous sheet of tab stock such that the first unique mark is positioned on the tab, wherein the production information about the tab includes information about the continuous sheet of tab stock.

12. The method of claim 1, further comprising:
   scanning the first unique mark with a sensor at a production facility to generate a production scan event having time and location information, wherein the production facility is at a location distinct from the filler location; and
   transmitting the production scan event to the database via the network, wherein the database is operable to associate the time and location information with the end closure based on the first unique mark.

13. The method of claim 6, wherein the first unique mark is located on a side of the tab that faces away from the end closure before the container is opened.

14. The method of claim 1, further comprising forming, by a laser, the first unique mark on a sheet of tab stock, wherein the laser alters a coating on the sheet of the tab stock to form the first unique mark, wherein the laser activates pigment in the coating on the sheet of the tab stock to form the unique mark.

15. A method for tracking and tracing containers during the production, distribution, sale, and to end of life collection of the containers, comprising:

providing a plurality of containers, wherein each container of said plurality of containers has at least one of a closed end or a tab;

forming a unique mark on at least one of said closed end or said tab of a container of said plurality of containers with an ink, a pigment, or laser etching at a production facility to produce said unique mark that comprises production information;

scanning said unique mark of said container with a sensor at said production facility to generate a first scan event having first time and first location information;

transmitting said first scan event to a database via a network, wherein said database is operable to associate said first time and first location information with said container and with said production information based on said unique mark;

scanning said unique mark of said container with a sensor at a filler facility to generate a second scan event having second time and second location information;

transmitting said second scan event to said database via said network, wherein said database is operable to associate said second time and second location information with said container based on said unique mark;

scanning said unique mark of said container with a sensor at a distribution facility to generate a third scan event having third time and third location information;

transmitting said third scan event to said database via said network, wherein said database is operable to associate said third time and third location information with said container based on said unique mark;

scanning said unique mark of said container with a sensor at a retailer facility to generate a fourth scan event having fourth time and fourth location information;

transmitting said fourth scan event to said database via said network, wherein said database is operable to associate said fourth time and fourth location information with said container based on said unique mark;

scanning said unique mark of said container with a sensor of a mobile device to generate a fifth scan event having mobile device information and fifth time and fifth location information;

transmitting said fifth scan event to said database via said network, wherein said database is operable to associate said container with said mobile device and with said fifth time and fifth location information based on said unique mark and said mobile device information;

scanning said unique mark of said container with a sensor of a collection device to generate a sixth scan event having deposit information and sixth time and sixth location information; and transmitting said sixth scan event to said database via said network, wherein said database is operable to associate said mobile device with said deposition information to associate said sixth time and sixth location information with said container based on said unique mark.

16. The method of claim 15, wherein said unique mark is formed with said pigment by:

applying a varnish layer to said closed end of each container, wherein said varnish layer comprises said pigment; and activating, with a laser device, some of said pigment in said varnish layer to produce said unique mark on each closed end.

17. The method of claim 15, wherein said unique mark is formed with said ink by:

coating an interior surface of each container by an interior coat spray unit; and forming, by an inkjet printer, said unique mark with said ink on said closed end as said interior coat spray unit coats said interior surface of each container.

18. The method of claim 15, wherein said unique mark is formed with said laser etching by:

forming, by a laser, at least one unique mark on a continuous sheet of aluminum material; and forming a container body of said container from said continuous sheet of aluminum material, wherein said unique mark is positioned on said closed end of said container body of said container.

19. The method of claim 15, wherein said unique mark is formed with said laser etching by:

forming, by a laser, at least one unique mark on said tab of an end closure; and joining said end closure with a container body to form said container.

20. A system for tracking and tracing a container, comprising:

a database configured to receive and store scan events, wherein a first unique mark is located on a tab of an end closure, and the first unique mark is transmitted to the database via a network where the first unique mark is associated with production information about the tab, wherein a second unique mark is located on a container body, and the second unique mark is transmitted to the database via the network where the second unique mark is associated with production information about the container body;

a filler sensor configured to transmit a scan event of the first unique mark and a scan event of the second unique mark at a filler location to the database via the network, wherein the end closure is joined with the container body to form the container at the filler location; and a sensor configured to transmit a scan event of at least one of the first unique mark and the second unique mark of the container to the database via the network, wherein the location of the sensor is distinct from the filler location.

* * * * *